US009843719B2

(12) United States Patent
Matsuzaki et al.

(10) Patent No.: US 9,843,719 B2
(45) Date of Patent: Dec. 12, 2017

(54) CONFOCAL MICROSCOPE

(71) Applicant: Panasonic Intellectual Property Management Co., Ltd., Osaka (JP)

(72) Inventors: Keiichi Matsuzaki, Kyoto (JP); Teruhiro Shiono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 286 days.

(21) Appl. No.: 14/443,819

(22) PCT Filed: Feb. 21, 2014

(86) PCT No.: PCT/JP2014/000940
§ 371 (c)(1),
(2) Date: May 19, 2015

(87) PCT Pub. No.: WO2014/132604
PCT Pub. Date: Sep. 4, 2014

(65) Prior Publication Data
US 2015/0304552 A1 Oct. 22, 2015

(30) Foreign Application Priority Data
Feb. 28, 2013 (JP) ................................. 2013-038386

(51) Int. Cl.
*G02B 21/00* (2006.01)
*H04N 5/232* (2006.01)
(Continued)

(52) U.S. Cl.
CPC ..... *H04N 5/23222* (2013.01); *G02B 21/0024* (2013.01); *G02B 21/0052* (2013.01);
(Continued)

(58) Field of Classification Search
CPC ... G02B 21/18; G02B 21/365; H04N 5/23222
(Continued)

(56) References Cited

U.S. PATENT DOCUMENTS 5,260,569 A 11/1993 Kimura
5,691,839 A 11/1997 Kobayashi
(Continued)

FOREIGN PATENT DOCUMENTS

JP 4-175713 6/1992
JP 5-27177 2/1993
(Continued)

OTHER PUBLICATIONS

Google Patent search log.*
(Continued)

*Primary Examiner* — Luis Perez Fuentes
(74) *Attorney, Agent, or Firm* — Wenderoth, Lind & Ponack L.L.P.

(57) ABSTRACT

The present application discloses a confocal microscope including a light generator configured to simultaneously generate reflection light, which is reflected from a sample, and transmission light, which passes through the sample; a scanner configured to optically scan the sample and define a direction of a first optical path, along which the reflection light propagates; an adjuster configured to angularly adjust a direction of a second optical path, along which the transmission light propagates; a first signal generator configured to generate a first signal based on the reflection light; a second signal generator configured to generate a second signal based on the transmission light; and an image generator configured to generate a synthetic image in which a reflection image represented by the reflection light and a transmission image represented by the transmission light are synthesized in response to the first and second signals.

19 Claims, 17 Drawing Sheets

(51) Int. Cl.
*G02B 21/18* (2006.01)
*G02B 21/08* (2006.01)
*H04N 5/225* (2006.01)
*G02B 27/10* (2006.01)
*G02B 27/14* (2006.01)

(52) U.S. Cl.
CPC ........... *G02B 21/088* (2013.01); *G02B 21/18* (2013.01); *G02B 27/1013* (2013.01); *G02B 27/141* (2013.01); *H04N 5/2254* (2013.01)

(58) Field of Classification Search
USPC ...................................................... 348/79, 80
See application file for complete search history.

(56) References Cited

U.S. PATENT DOCUMENTS

| | | | |
|---|---|---|---|
| 5,936,764 A | 8/1999 | Kobayashi | |
| 6,259,473 B1* | 7/2001 | Iko | G01N 23/04 348/80 |
| 7,312,920 B2* | 12/2007 | Okugawa | G02B 21/0048 250/236 |
| 8,994,808 B2* | 3/2015 | Okamoto | G02B 21/365 348/79 |
| 2005/0012989 A1* | 1/2005 | Kei | G02B 21/0024 359/368 |
| 2006/0012872 A1* | 1/2006 | Hayashi | G01N 21/21 359/386 |
| 2011/0102572 A1 | 5/2011 | Kihara et al. | |
| 2012/0243081 A1 | 9/2012 | Honda | |

FOREIGN PATENT DOCUMENTS

| | | |
|---|---|---|
| JP | 6-300974 | 10/1994 |
| JP | 7-248453 | 9/1995 |
| JP | 11-326860 | 11/1999 |
| JP | 2002-40329 | 2/2002 |
| JP | 2006-72147 | 3/2006 |
| JP | 2010-14837 | 1/2010 |
| JP | 2011-95685 | 5/2011 |
| JP | 2011-252950 | 12/2011 |
| JP | 2012-155299 | 8/2012 |
| JP | 2012-203049 | 10/2012 |
| JP | 2012-208486 | 10/2012 |

OTHER PUBLICATIONS

An Image Model and Segmentation Algorithm for Reflectance Confocal Images of In Vivo Cervical Tissue; Luck; 2005.*
Frames-Based Denoising in 3D Confocal Microscopy Imaging; Konstantinidis,; 2005.*
Fluorescence Confocal Microscopy Imaging Denoising with Photobleaching; Xavier; 2008.*
International Search Report dated May 27, 2014 in International (PCT) Application No. PCT/JP2014/000940.

* cited by examiner

CONFOCAL MICROSCOPE

TECHNICAL FIELD

The present invention relates to a confocal microscope used to observe a sample.

BACKGROUND ART

Various microscopes are used for observing samples such as cells. Patent Document 1 discloses a microscope which optically scans a sample. An observer may use the microscope to observe the sample.

FIG. 17 is a schematic view of a scanning optical microscope (hereinafter, referred to as a microscope 900) of Patent Document 1. The microscope 900 is described with reference to FIG. 17.

The microscope 900 includes a laser source 901, a beam splitter 902, a lens 903, an acousto-optic deflector (hereinafter, referred to as an AOD 904) and a signal source 905. The laser source 901 emits a laser beam to the beam splitter 902. The beam splitter 902 reflects the laser beam to the lens 903. The laser beam is then incident on the AOD 904 through the lens 903.

The signal source 905 outputs a driving signal to the AOD 904. The AOD 904 changes a grating constant (grating width) of an ultrasonic diffraction grating, caused in a crystalline medium in response to the driving signal. Consequently, the AOD 904 may control deflection of the laser beam.

The microscope 900 further includes mirrors 906, 907, a lens 908, a resonant galvanometer 909, a resonant vibration mirror 910 and a signal source 911. The AOD 904 performs a one-dimensional scanning operation at high speed. The laser beam is then reflected to the mirror 907 by the mirror 906. The laser beam is reflected to the lens 908 by the mirror 907. The laser beam passes through the lens 908, and reaches the resonant vibration mirror 910 mounted on the galvanometer 909.

The signal source 911 outputs a driving signal to the galvanometer 909. The galvanometer 909 resonantly vibrates the resonant vibration mirror 910 in response to the driving signal. Consequently, the laser beam is reflected by the resonant vibration mirror 910 performing a sinusoidal deflection operation.

The galvanometer 909 and the resonant vibration mirror 910 perform a scanning operation in a direction orthogonal to a direction of the scanning operation performed by the AOD 904. The galvanometer 909 and the resonant vibration mirror 910 perform a two-dimensional scanning operation in cooperation with the AOD 904.

The microscope 900 further includes spherical relay mirrors 912, 913, a galvanometer 914, a galvanomirror 915 and a signal source 916. The laser beam is reflected from the resonant vibration mirror 910 to the spherical relay mirror 912. The spherical relay mirror 912 reflects the laser beam to the spherical relay mirror 913. The spherical relay mirror 913 reflects the laser beam to the galvanomirror 915 mounted on the galvanometer 914.

The signal source 916 outputs a driving signal to the galvanometer 914. The galvanometer 914 drives the galvanomirror 915 in response to the driving signal. The galvanometer 914 and the galvanomirror 915 perform a scanning operation in a direction parallel to a direction of the scanning operation performed by the AOD 904. In short, the galvanometer 914 and the galvanomirror 915 perform the scanning operation in a direction orthogonal to the direction of the scanning operation of the galvanometer 909 and the resonant vibration mirror 910.

The microscope 900 further includes a beam splitter 917, a relay lens 918 and an object lens 919. The laser beam reflected by the galvanomirror 915 is incident on the object lens 919 through the beam splitter 917 and the relay lens 918. The object lens 919 condenses light on a sample SMP.

The microscope 900 includes an object lens 920, a mirror 921, a relay lens 922, a mirror 923, a wavelength plate 924, a polarization plate 925, a pentagonal prism 926 and a relay lens 927. The sample SMP is situated between the object lenses 919, 920. The object lens 920 has optical characteristics analogous to the object lens 919. The object lens 920, the mirrors 921, 923, the relay lenses 922, 927, the wavelength plate 924, the polarization plate 925 and the pentagonal prism 926 are used to observe a transmission image represented by transmission light which passes through the sample SMP. The transmission light propagates along an optical path defined by the object lens 920, the mirror 921, the relay lens 922, the mirror 923, the wavelength plate 924, the polarization plate 925, the pentagonal prism 926 and the relay lens 927. The transmission light passing through the relay lens 927 is incident on the beam splitter 917. The transmission light is reflected by the beam splitter 917. Consequently, the transmission light propagates along the optical path defined by the beam splitter 917, the galvanomirror 915, the spherical relay mirrors 913, 912, the resonant vibration mirror 910, the lens 908, the mirrors 907, 906, the AOD 904 and the lens 903 to be incident on the beam splitter 902.

The wavelength plate 924 and the polarization plate 925 use rotation of a polarization face of light to allow detection of only the transmission light. There is little optical loss resulting from the wavelength plate 924 and the polarization plate 925.

The pentagonal prism 926 reverses the optical path of the transmission light in a one-dimensional direction. Consequently, the optical path of the transmission light is combined with the optical path of the laser beam emitted from the laser source 901.

The microscope 900 further includes a lens 928, a confocal opening member 929, a polarization plate 930, a filter 931 and a photo receiver 932. The beam splitter 902 allows passage of the transmission light. The transmission light sequentially passes through the lens 928, the confocal opening member 929, the polarization plate 930 and the filter 931 to enter into the photo receiver 932.

The lens 928 condenses light toward the confocal opening member 929. The confocal opening member 929 has an opening portion 933 at a focal position defined by the lens 928. Accordingly, the confocal opening member 929 and the sample SMP are conjugate with each other optically. The confocal opening member 929 blocks stray light components around the focal point. Consequently, there are improved resolution and contrast of an obtained image.

The microscope 900 may use light reflected from the sample SMP to form an image. The light reflected from the sample SMP propagates along the optical path defined by the object lens 919, the beam splitter 917, the galvanomirror 915, the spherical relay mirrors 913, 912, the resonant vibration mirror 910, the lens 908, the mirrors 907, 906, the AOD 904, the lens 903, the beam splitter 902, the confocal opening member 929, the polarization plate 930 and the filter 931 to be incident on the photo receiver 932.

As described above, since the confocal opening member 929 blocks the stray light components around the focal point, a lot of stray light components are removed from the Eight (transmission light and reflection light) which the photo receiver 932 receives. Accordingly, the photo receiver 932 may generate an image signal for representing a sample under little noise.

An observer may adjust polarization directions of the polarization plates 925, 930 to selectively observe an image (hereinafter, referred to as a transmission image) represented by transmission light and an image (hereinafter, referred to as a reflection image) represented by reflection light.

The microscope 900 further includes a signal processing device 934 and a display device 935. The image signal is transmitted from the photo receiver 932 to the signal processing device 934. The signal processing device 934 processes the image signal to adapt the image signal to an input format of the display device 935. The image signal is then output from the signal processing device 934 to the display device 935. The display device 935 displays the transmission image or the reflection image in response to the image signal.

An observer using the microscope 900 to observe the sample SMP may not obtain both of the transmission image and the reflection image without adjustment to the polarization directions of the polarization plates 925, 930. Accordingly, it necessarily takes a long time for the observer to obtain both of information contained in the transmission image and information contained in the reflection image. In addition, there is a time lag between acquisitions of the transmission image and the reflection image. Accordingly, the microscope 900 is not suitable for observation of a sample changing over time.

Patent Document 2 discloses a microscope (confocal microscope) different from the microscope 900. The microscope of Patent Document 2 is used very suitably to detect defects of a photomask.

The microscope of Patent Document 2 emits a laser beam to optically scan the photomask. The laser beam (transmission light) passing through the photomask propagates along the optical path which is common with the reflection light obtained by reflection of the laser beam on the photomask. The microscope may perform correlation processes between the transmission image and the reflection image to detect defects of the photomask very accurately.

Accuracy in detection of the microscope of Patent Document 2 depends on optical characteristics of a sample. For example, if a sample causes birefringence, a part of the reflection image may be contained in the transmission image. Alternatively, a part of the transmission image may be contained in the reflection image.

PATENT DOCUMENT

Patent Document 1: JP H06-300974 A
Patent Document 2: JP 2002-40329 A

SUMMARY OF INVENTION

An object of the invention is to provide a confocal microscope which allows quick acquisition of a lot of accurate information about a sample.

A confocal microscope according to one aspect of the present invention includes a light generator configured to simultaneously generate reflection light, which is reflected from a sample, and transmission light, which passes through the sample, a scanner configured to optically scan the sample and define a direction of a first optical path, along which the reflection light propagates, an adjuster configured to angularly adjust a direction of a second optical path, along which the transmission light propagates, a first signal generator configured to generate a first signal based on the reflection light, a second signal generator configured to generate a second signal based on the transmission light, and an image generator configured to generate a synthetic image in which a reflection image represented by the reflection light and a transmission image represented by the transmission light are synthesized in response to the first and second signals.

The aforementioned confocal microscope allows an observer to quickly obtain a lot of accurate information about a sample.

Objects, characteristics and advantages of the invention will be clarified by the following detailed description and accompanying drawings.

DESCRIPTION OF EMBODIMENTS

Figure 1:
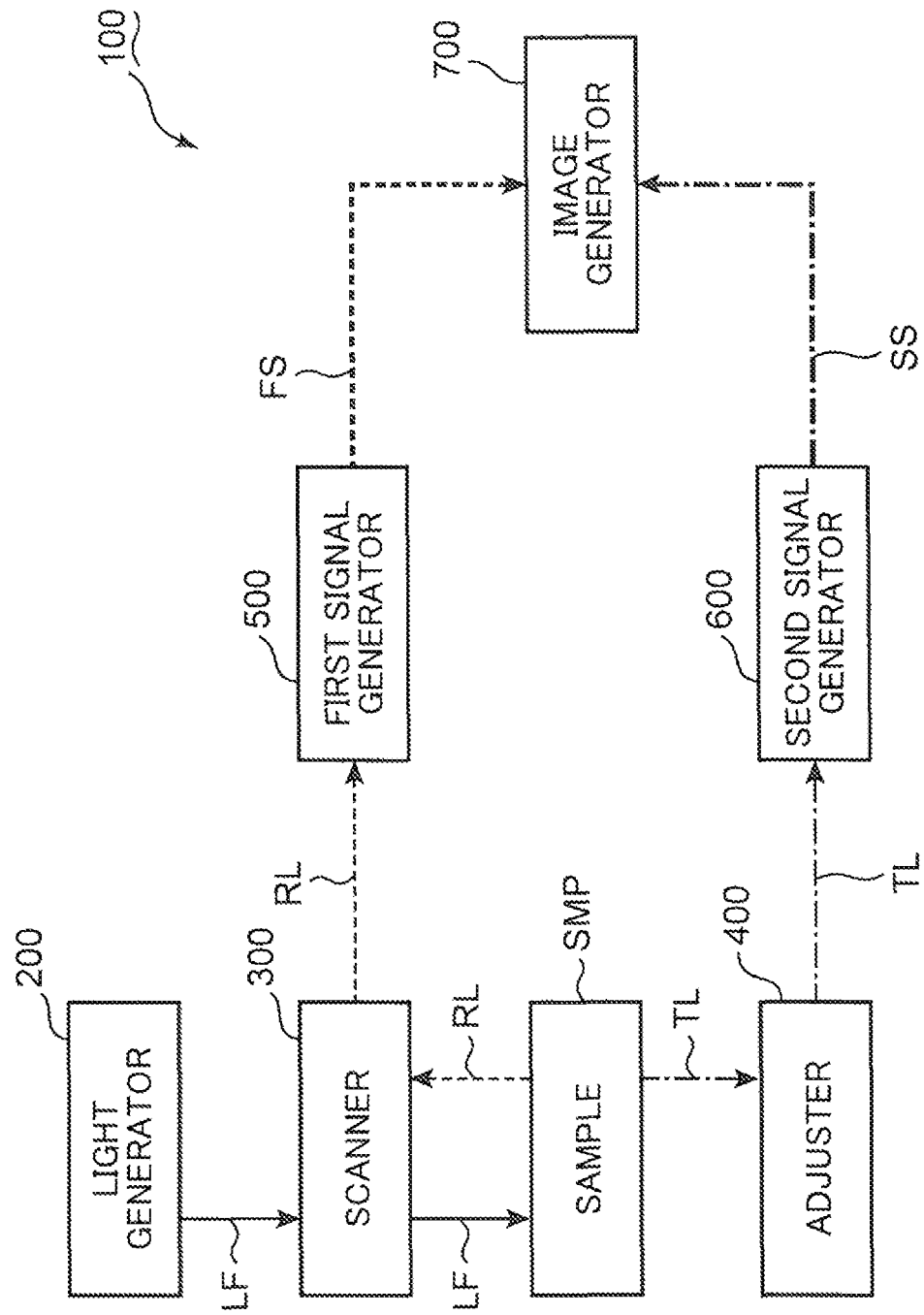
FIG. 1 is a schematic block diagram of a confocal microscope according to the first embodiment.

Various embodiments of an exemplificative confocal microscope are described with reference to the drawings. In the following embodiments, the same reference numerals and signs are attached to the same components. Redundant description is omitted for clear explanation. Configurations, arrangements or shapes shown in the drawings and description about the drawings are merely to make principles of the present embodiments easily understood. Accordingly, the principles of the following embodiments are not limited to them.

Problem of Related Art

The inventors have studied conventional microscope techniques, and have found various problems. The following confocal microscopes described in various embodiments have been developed to solve such problems.

(Problems in Microscope Techniques of Patent Document 1)

Figure 17:
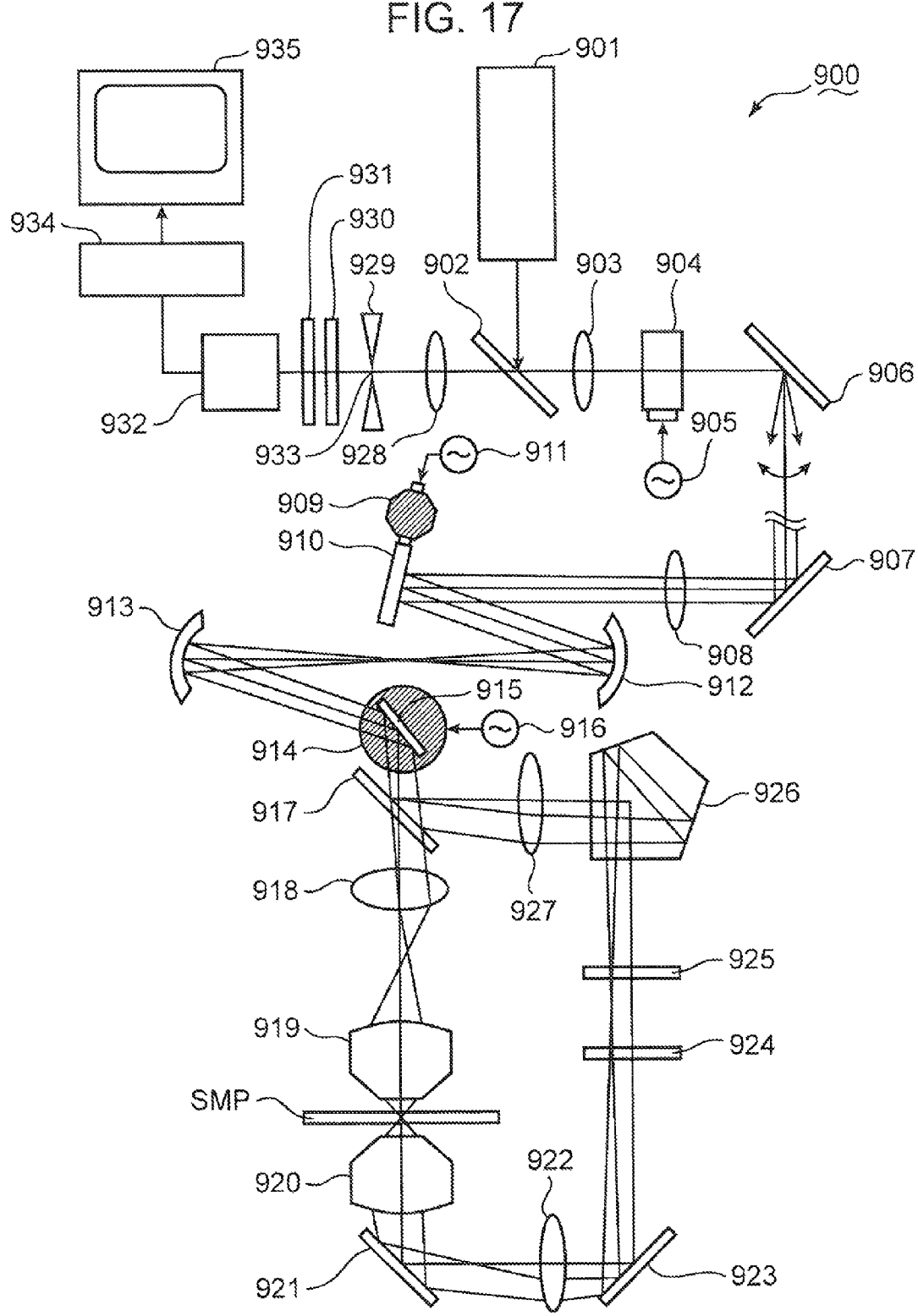
FIG. 17 is a schematic view of a conventional microscope.

Problems in the microscope 900 of Patent Document 1 are described with reference to FIG. 17.

As described above, an observer may operate the polarization plates 925, 930 of the microscope 900 to control polarization directions of reflection light and transmission light. As a result of the control of the polarization directions, the microscope 900 may selectively generate only one of an image signal generated from the transmission light and an image signal generated from the reflection light.

The microscope 900 has only a single signal generating element (a photo receiver 932) to generate the image signal generated from the transmission light and the image signal generated from the reflection light. Accordingly, the microscope 900 may not simultaneously generate a transmission image and a reflection image. This is inconvenient for observation of a sample (e.g. biological tissues or cells) with characteristics changing over time.

Since the transmission light and the reflection light are incident on the common photo receiver 932, the observer has to mechanically operate the polarization plates 925, 930 for obtaining the transmission image and the reflection image. It takes a time to mechanically operate the polarization plates 925, 930. Accordingly, the microscope 900 is not suitable when the microscope has to obtain the transmission image and the reflection image quickly.

The mechanical operation for the polarization plates 925, 930 may cause positional errors of the polarization plates 925, 930 for optical paths of the transmission light and the reflection light. The positional errors result in decreased accuracy of the transmission image and the reflection image. For example, if there are positional errors of the polarization plates 925, 930 resulting from the mechanical operation for the polarization plates 925, 930, there are phenomena (hereinafter, referred to as "crosstalk") in which one of the transmission image and the reflection image appears on the other of the transmission image and the reflection image. In short, there is a decrease in signal-to-noise (hereinafter, referred to as an SN ratio) of the image signal generated by the photo receiver 932.

Another problem may arise in the microscope 900 when the microscope is assembled. In order to obtain accurate transmission and reflection images under usage of the microscope 900, the optical path of the transmission light emitted from the pentagonal prism 926 has to be coincident with the optical path of the reflection light. However, adjustment to an optical axis for the coincidence of the optical paths between the transmission light and the reflection light has to be very accurate. Accordingly, an initial adjustment for the microscope 900 needs very skilled expertise.

A difference in optical axis between the transmission light and the reflection light may be caused by external factors (e.g. change in ambient temperature or vibration). This means insufficient reproducibility or instability of image data obtained from the microscope 900.

Accuracy of the image data obtained from the microscope 900 also depends on optical characteristics of a sample. When the sample has optical characteristics which cause birefringence, there is disturbance in polarization of the transmission light and the reflection light. Consequently, an observer may not obtain accurate transmission and reflection images. For example, a decrease in SN ratio, which is caused by the aforementioned crosstalk, may happen to image data.

(Problems in Microscope Techniques of Patent Document 2)

Unlike the microscope techniques of Patent Document 1, Microscope techniques of Patent Document 2 use two photo receivers. One of the two photo receivers receives only transmission light. The other one of the two photo receivers receives only reflection light. However, the transmission light and the reflection light propagate along a common optical path. Accordingly, like the microscope techniques of Patent Document 1, image accuracy of the microscope techniques of Patent Document 2 is likely to be affected by optical characteristics of a sample. If the sample has optical characteristics which cause birefringence, there is a decrease in SN ratio under the crosstalk.

According to Patent Document 2, an observer observes a photomask as a sample, and detects defects of the photomask. Since there is no birefringence caused by the photomask and a large amount of the transmission light and the reflection light which are emitted from the photomask, the microscope techniques of Patent Document 2 may accurately detect defects of the photomask. However, when a biological tissue is observed instead of the photomask, the microscope techniques of Patent Document 2 may not achieve a high SN ratio since there is a complicated internal geometry in the biological tissue and a much less acceptable quantity of irradiated light to the biological tissue than the photomask.

First Embodiment

The inventors have developed a confocal microscope configured to accurately generate image data for various samples. Technical principles described in the context of the first embodiment allow an observer to substantially simultaneously obtain a transmission image and a reflection image even under a condition in which there are small differences in refractive index of a sample and small reflectivity of the sample. Accordingly, the technical principles described in the context of the first embodiment may be very suitably applied to observation of biological tissues or cells. The technical principles described in the context of the first embodiment allow an observer to non-invasively observe biological tissues or cells without a marking work using fluorescent substances. The technical principles described in the context of the first embodiment may be suitably used for observation of samples other than biological tissues or cells. Therefore, the principles of the first embodiment are not limited to a specific type of samples.

FIG. 1 is a schematic block diagram of a confocal microscope (hereinafter, a microscope 100) according to the first embodiment. The microscope 100 is described with reference to FIG. 1.

An observer may use the microscope 100 to observe the sample SMP. The microscope 100 includes a light generator 200, a scanner 300, an adjuster 400, a first signal generator 500, a second signal generator 600 and an image generator 700.

The light generator 200 emits a light flux LF. The light flux LF reaches the sample SMP through the scanner 300. Consequently, transmission light TL passing through the sample SMP and reflection light RL reflected from the sample SMP are simultaneously generated. The light generator 200 may include a laser, a light bulb, a light-emitting diode, a halogen lamp, an infrared light source or other light sources configured to emit light suitable for observation of the sample SMP. The principles of the present embodiment are not, limited to a specific light source used as the light generator 200.

The scanner 300 uses the light flux LF to optically scan the sample SMP. When the seamier 300 two-dimensionally and sequentially changes an irradiation position of the light flux LF in the sample SMP, an observer may obtain two-dimensional image data of the sample SMP. The principles of the present embodiment are not limited to a specific scanning operation performed by the scanner 300.

The reflection light RL propagates from the sample SMP to the scanner 300. The reflection light RL then propagates from the scanner 300 to the first signal generator 500. In the present embodiment, the first optical path is exemplified by the optical path of the reflection light RL directed from the scanner 300 to the first signal generator 500.

The scanner 300 optically scans the sample SMP and simultaneously determines a direction of the reflection light RL propagating from the scanner 300 to the first signal generator 500 so that the reflection light RL reaches the first signal generator 500. An optical design for optically scanning the sample SMP and receiving the reflection light RL by the first signal generator 500 may be based on a variety of existing design techniques. Accordingly, the principles of the present embodiment are not limited to a specific arrangement of an optical element group defining an optical path formed among the light generator 200, the scanner 300, the sample SMP and the first signal generator 500.

The transmission light TL propagates from the sample SMP to the adjuster 400. The transmission light TL then propagates from the adjuster 400 to the second signal generator 600. Unlike the microscope techniques of Patent Documents 1 and 2 the optical path of the transmission light TL is separated from the reflection light RL. Accordingly, unlike the microscope techniques of Patent Document 1, the microscope 100 does not require severe optical axis adjustment between the transmission light TL and the reflection light RL. In addition, the microscope 100 is less likely to face conventional problems such as crosstalk. In the present embodiment, the second optical path is exemplified by the optical path of the transmission light TL from the sample SMP to the second signal generator 600 through the adjuster 400.

As a result of the scanning operation of the scanner 300, the optical path of the transmission light TL from the sample SMP to the adjuster 400 is angularly changed. The adjuster 400 angularly adjusts a direction of the optical path of the transmission light TL so that the second signal generator 600 appropriately receives the transmission light TL even under the angular change in the optical path of the transmission light TL between the sample SMP and the adjuster 400.

The first signal generator 500 receives the reflection light RL. The first signal generator 500 then generates a first signal FS in correspondence to the reflection light RL. The first signal generator 500 may generate a signal as the first signal FS, the signal having a voltage level or amplitude at a level which corresponds to an amount of the reflection light RL, or intensity of the reflection light RL. When there is a large amount of the reflection light RL, the first signal generator 500 may output a signal having large amplitude as the first signal FS. The principles of the present embodiment are not limited to a specific signal generating technique of the first signal generator 500.

The second signal generator 600 receives the transmission light TL. The second signal generator 600 then generates a second signal SS in correspondence to the transmission light TL. The second signal generator 600 may generate a signal as the second signal SS, the signal having a voltage level or amplitude in correspondence to an amount of the transmission light TL or intensity of the transmission light TL. When there is a large amount of the transmission light TL, the second signal generator 600 may output a signal having large amplitude as the second signal SS. The principles of the present embodiment are not limited to a specific signal generating technique of the second signal generator 600.

The first signal FS is output from the first signal generator 500 to the image generator 700. The second signal SS is output from the second signal generator 600 to the image generator 700. The transmission of the first signal FS from the first signal generator 500 to the image generator 700 means data transmission of the reflection image represented by the reflection light RL. The transmission of the second signal SS from the second signal generator 600 to the image generator 700 means data transmission of the transmission image represented by the transmission light TL. The image generator 700 generates a synthetic image, in which the reflection image and the transmission image are synthesized, in response to the first and second signals FS, SS. An observer may observe the synthetic image to simultaneously obtain image information from the reflection image and the transmission image. Since the observation timing of the sample SMP represented by the reflection image is substantially equivalent to the timing of observing the sample SMP represented by the transmission image, the observer may obtain accurate information about a condition of the sample SMP.

The image generator 700 may change a type of generated image in response to optical characteristics of the sample SMP. If the sample SMP has to reflectivity as a whole, the image generator 700 may generate the transmission image instead of the synthetic image. When the sample SMP has high reflectivity as a whole, the image generator 700 may generate the reflection image instead of the synthetic image. An observer may operate the image generator 700 to select a type of an image generated by the image generator 700 front the synthetic image, the transmission image and the reflection image. The principles of the present embodiment are not limited to a specific image generating technique of the image generator 700.

If the sample SMP has a large change in reflectivity and/or transmissivity, it is advantageous to generate the synthetic image by using the image generator 700. The transmission image contains little information about an area with low transmissivity in the sample SMP whereas the reflection image may contain a let of information about the area with low transmissivity in the sample SMP. Accordingly, the image generator 700 may apply the reflection image to the area with low transmissivity of the sample SMP. The reflection image contains little information about an area with low reflectivity of the sample SMP whereas the transmission image may contain a lot of information about the area with low reflectivity of the sample SMP. Accordingly, the image generator 700 may apply the transmission image to the area with low reflectivity of the sample SMP. Consequently, an observer may obtain a lot of information about the sample SMP from the synthetic image.

The image generator 700 may use the transmission image to show the outline of the sample SMP. When a position deviating from the sample SMP is irradiated with the light flux LF, there is a growth in signal strength of the second signal SS. When the sample SMP is irradiated with the light flux LF, the sample SMP causes scattering and absorption of the light flux LF, so that there is a decreased amount of the transmission light TL. Accordingly, there is a decrease in signal strength of the second signal SS while the sample SMP is irradiated with the light flux LF. Therefore, the image generator 700 may use the second signal SS representing the transmission image to show the outline of the sample SMP with high contrast.

When a substance with low reflectivity such as a biological tissue or a cell is observed as the sample SMP, the reflection image is not suitable to show the outline of the sample SMP. However, the reflection image may be used to show a surficial or internal condition of the sample SMP since the surficial or internal condition of the sample SMP is represented as a change in reflectivity of the sample SMP. When the image generator 700 uses the second signal SS for the outline, area of the sample SMP and the first signal FS for the internal area of the sample SMP surrounded by the outline area, a resultant synthetic image may show various characteristics of the sample SMP.

Since the microscope 100 generates the synthetic image in which the transmission image and the reflection image are synthesized, an observer may not perform a preliminary process (e.g. addition of fluorescent substances) for increasing reflectivity of the sample SMP. Accordingly, when biological tissues or cells are observed as the sample SMP, the observer may observe the biological tissues or cells in a living state.

Second Embodiment

A designer may use the principles of the first embodiment to design various confocal microscopes. An exemplificative confocal microscope designed on the basis of the principle of the first embodiment is described in the second embodiment.

Figure 2:
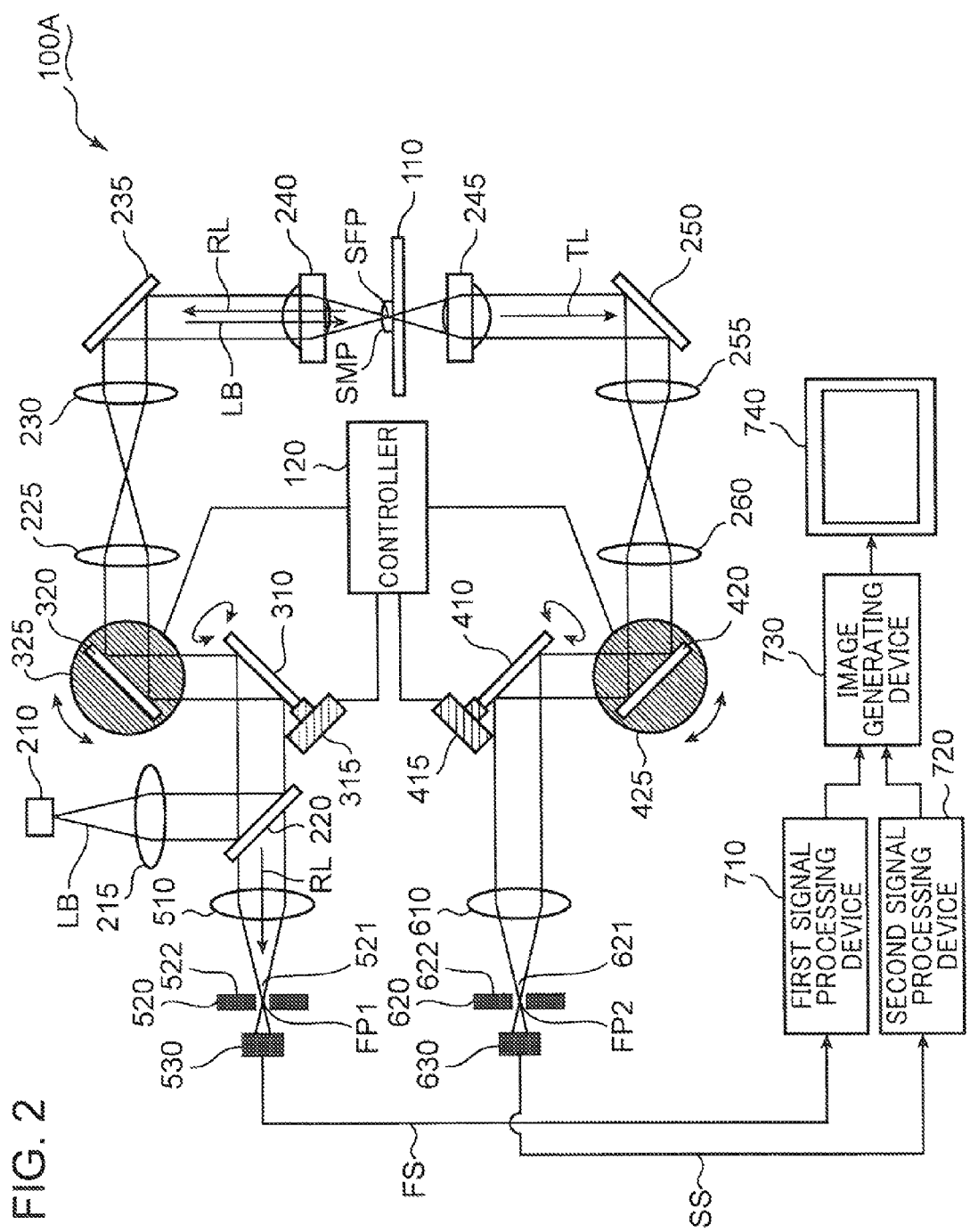
FIG. 2 is a schematic view of a confocal microscope according to the second embodiment.

FIG. 2 is a schematic view of a confocal microscope (hereinafter, referred to as a microscope 100A) according to the second embodiment. The microscope 100A is described with reference to FIGS. 1 and 2. The common reference numerals and signs between the first and second embodiments are applied to elements having the same functions as the first embodiment. Accordingly, the description in the first embodiment is applicable to these elements.

The microscope 100A includes a laser source 210, a collimator lens 215, a beam splitter 220, relay lenses 225, 230, a reflection mirror 235 and an object lens 240. The laser source 210, the collimator lens 215, the beam splitter 220, the relay lenses 225 and 230, the reflection mirror 235 and the object lens 240 are designed as a part of the light generator 200 described with reference to FIG. 1.

The microscope 100A further includes a first deflection mirror 310, a second deflection mirror 320, a first driving motor 315 and a second driving motor 325. The first and second deflection mirrors 310, 320 and the first and second driving motors 315, 325 are designed as the scanner 300 described with reference to FIG. 1.

The laser source 210 emits a laser beam LB to the collimator lens 215. The laser beam LB corresponds to the light flux LF described with reference to FIG. 1. In the present embodiment, the light source portion is exemplified by the laser source 210. The emission light is exemplified by the laser beam LB.

The collimator lens 215 forms the laser beam LB into collimated light. The laser beam LB is then incident on the beam splitter 220. The beam splitter 220 reflects the laser beam LB to the first deflection mirror 310. The first deflection mirror 310 then reflects the laser beam LB to the second deflection mirror 320. The second deflection mirror 320 reflects the laser beam LB to the reflection mirror 235. The laser beam LB sequentially passes through the relay lenses 225, 230, and is incident on the reflection mirror 235. The reflection mirror 235 reflects the laser beam LB to the object lens 240. The relay lenses 225, 230 are situated to obtain a conjugate relationship between the second deflection mirror 320 and an exit pupil of the object lens 240. Accordingly, the laser beam LB may be incident on the object lens 240 at an appropriate position and an appropriate angle. In the present embodiment, the first reflective portion is exemplified by a set of the first and second deflection mirrors 310, 320.

The object lens 240 condenses the laser beam LB toward the sample SMP to form a sample focal point SFP. A position of the sample focal point SFP is changed in response to operations of the first and second deflection mirrors 310, 320 and the first and second driving motors 315, 325, which are designed as the scanner 300.

The microscope 100A further includes a slide glass 110. An observer may place the sample SMP on the slide glass 110. The first deflection mirror 310 is connected to the first driving motor 315. The first driving motor 315 gives the first deflection mirror 310 a rotational movement. Consequently, the sample focal point SFP linearly moves in a main scanning direction defined on the slide glass 110. The second deflection mirror 320 is connected to the second driving motor 325. The second driving motor 325 gives the second deflection mirror 320 a rotational movement. Consequently, the sample focal point SFP linearly moves in a sub-scanning direction substantially perpendicular to the main scanning direction defined on the slide glass 110. Therefore, the sample focal point SFP may move on a virtual plane substantially in parallel to a surface of the slide glass 110 on which the sample SMP is placed. A designer may define the main scanning direction, and the sub-scanning direction in light of design conditions for the microscope 100A. Accordingly, the definition about the main scanning direction and the sub-scanning direction does not limit the principles of the present embodiment. In the present embodiment, the first driver is exemplified by a set of the first and second driving motors 315, 325.

In the present embodiment, the first and second deflection mirrors 310, 320 and the first and second driving motors 315, 325 are designed as the scanner 300. Alternatively, the scanner 300 may be designed by using, an acousto-optic element, an electro-optic element, a galvanomirror, a polygonal mirror, MEMS (Micro Electra Mechanical Systems) and the other optical elements configured to optically scan the sample SMP at high speed.

A part of the laser beam LB is reflected by the sample SMP, and becomes the reflection light RL. The reflection light RL emitted from the sample focal point SFP is divergence light. The reflection light RL propagates from the sample focal point SFP to the object lens 240. The object lens 240 forms the reflection light RL into collimated light. The reflection light RL is then reflected by the reflection mirror 235, and is incident on the second deflection mirror 320 through the relay lenses 230, 225. The second deflection mirror 320 reflects the reflection light RL to the first deflection mirror 310. The reflection light RL is reflected to the beam splitter 220 by the first deflection mirror 310. In the present embodiment, the first collimated, light is exemplified by the collimated light which is formed by the object lens 240.

The microscope 100A further includes a first detection lens 510, a first pinhole member 520 and a first light detector 530. The first detection lens 510, the first pinhole member 520 and the first light detector 530 are designed as the first signal generator 500 described with reference to FIG. 1.

The reflection light RL passes through the beam splitter 220, and is incident on the first detection lens 510. The first detection lens 510 condenses the reflection light RL to form a first focal point FP1. In the present embodiment, the first optical condenser is exemplified by the first detection lens 510. The first optical path is exemplified by the optical paths of the laser beam LB and the reflection light RL between the sample SMP and the beam splitter 220.

The first pinhole member 520 is provided with a first pinhole 521 around the first focal point FP1. The first pinhole member 520 includes a blocking area 522 surrounding the first pinhole 521. Components of the reflection light RL forming the first focal point FP1 propagates to the first light detector 530 through the first pinhole 521. The blocking area 522 removes stray light components of the reflection light RL around the first focal point FP1. In the present embodiment, the first transmissive member is exemplified by the first pinhole member 520. The first transmissive area is exemplified by the first pinhole 521. The first blocking area is exemplified by the blocking area 522.

The first light detector 530 detects intensity of the reflection light RL passing through the first pinhole 521. The first tight detector 530 then generates a first signal FS in correspondence to intensity of the reflection light RL. In the present embodiment, The first detector is exemplified by the first light detector 530.

The microscope 100A further includes a collimator lens 245, a reflection mirror 250 and relay lenses 255, 260. The collimator lens 245, the reflection mirror 250 and the relay lenses 255, 260 are designed as a part of the light generator 200 described with reference to FIG. 1.

A part of the laser beam LB passes through the sample SMP as the transmission light TL, and is incident on the collimator lens 245. The transmission light TL directed to the collimator lens 245 is divergence light. The collimator lens 245 forms the transmission light TL into collimated light. The collimator lens 245 may be equivalent in optical characteristics to the object lens 240. In the present embodiment, the second collimated light is exemplified by the collimated light which is formed by the collimator lens 245.

The transmission light TL passing through the collimator lens 245 is reflected to the relay lenses 255, 260 by the reflection mirror 250. The transmission light TL is then emitted from the relay lens 260. The transmission light TL emitted from the relay lens 260 is collimated light.

The microscope 100A further includes a third deflection mirror 410, a fourth deflection mirror 420, a third driving motor 415 and a fourth driving motor 425. The third and fourth deflection mirrors 410, 420 and the third and fourth driving motors 415, 425 are designed as the adjuster 400 described with reference to FIG. 1.

The third deflection mirror 410 is connected to the third driving motor 415. The third driving motor 415 gives the third deflection mirror 410 a rotational movement. The arrangement of the third deflection mirror 410 (e.g. an inclination angle from the optical path of the transmission light TL) may be determined in correspondence to the arrangement of the first deflection mirror 310 (e.g. an inclination angle from the optical path of the reflection light RL). The third deflection mirror 410 and the third driving motor 415 are operated so as to reduce a change in optical path of the transmission light TL under displacement of the sample focal point SFP in the main scanning direction.

The fourth deflection mirror 420 is connected to the fourth driving motor 425. The fourth driving motor 425 gives the fourth deflection mirror 420 a rotational rotation. The arrangement of the fourth deflection mirror 420 (e.g. an inclination angle from the optical path of the transmission light TL) may be determined in correspondence to the arrangement of the second deflection mirror 320 (e.g. an inclination angle from the optical path of the reflection light RL). The fourth deflection mirror 420 and the fourth driving motor 425 are operated so as to reduce a change in optical path of the transmission light TL under displacement of the sample focal point SFP in the sub-scanning direction.

The microscope 100A further includes a controller 120. The controller 120 controls the first driving motor 315, the second driving motor 325, the third driving motor 415 and the fourth driving motor 425. The controller 120 may associate operation of the third driving motor 415 with operation of the first driving motor 315. The controller 120 may associate operation of the fourth driving motor 425 with operation of the second driving motor 325.

The transmission light TL passing through the relay lens 260 is reflected to the third deflection mirror 410 by the fourth deflection mirror 420. The third deflection mirror 410 reflects the transmission light TL to the optical element group designed as the second signal generator 600 described with reference to FIG. 1. The optical path of the transmission light TL from the sample SMP to the relay lens 260 is changed by displacement of the sample focal point SFP. Since the controller 120 controls the third and fourth driving motors 415, 425 in response to the displacement of the sample focal point SFP (i.e. in response to the operations of the first and second driving motors 315, 325), the optical path of the transmission light TL reflected by the third deflection mirror 410 is stable in position. In the present embodiment, the second reflective portion is exemplified by a set of the third and fourth deflection mirrors 410, 420. The second driver is exemplified by a set of the third and fourth driving motors 415, 425.

The microscope 100A further includes a second detection lens 610, a second pinhole member 620 and a second light detector 630. The second detection lens 610, the second pinhole member 620 and the second light detector 630 are designed as the second signal generator 600 described with reference to FIG. 1.

The transmission light TL reflected by the third deflection mirror 410 is incident on the second detection lens 510. The second detection lens 610 condenses the transmission light TL to form a second focal point FP2. In the present embodiment, the second optical condenser is exemplified by the second detection lens 610. The second optical path is exemplified by the optical path of the transmission light TL between the sample SMP and the second detection lens 610.

The second pinhole member 620 is provided with a second pinhole 621 around the second focal point FP2. The second pinhole member 620 includes a blocking area 622 surrounding the second pinhole 621. Components of the transmission light TL forming the second focal point FP2 propagate to the second light detector 630 through the second pinhole 621. The blocking area 622 removes stray light components of the transmission light TL around the second focal point FP2. In the present embodiment, the second transmissive member is exemplified by the second pinhole member 620. The second transmissive area is exemplified by the second pinhole 621. The second blocking area is exemplified by the blocking area 622.

The second light detector 630 detects intensity of the transmission light TL passing through the second pinhole 621. The second light detector 630 then generates a second signal SS in correspondence to the intensity of the transmission light TL. In the present embodiment, the second detector is exemplified by the second light detector 630.

There is a conjugate relationship between the sample focal point SFP and the first focal point FP1 and between the sample focal point SFP and the second focal point FP2. The first pinhole member 520 defines the first pinhole 521 to match the first focal point FP1. The second pinhole member 620 defines the second pinhole 621 to match the second focal point FP2. Accordingly, the first pinhole member 520 may allow passage of components of the reflection light RL if the components form the first focal point FP1, and remove most of unnecessary stray light components around the first focal point FP1. Likewise, the second pinhole member 620 may allow passage of components of the transmission light TL if the components form the second focal point FP2, and remove most of unnecessary stray light components around the second focal point FP2. Consequently, the first signal FS contains little noise resultant from the stray light components around the first focal point FP1. Likewise, the second signal SS contains little noise resultant from the stray light components around the second focal point FP2. This means that the microscope 100A may generate an image with high resolution and high contrast.

The first light detector 530 may include a general photoelectric conversion element. Likewise, the second light detector 630 may include a general photoelectric conversion element. The first light detector 530 receiving the reflection light RL which has passed through the first pinhole member 520 generates a signal representing intensity of the reflection light RL as the first signal FS. The second light detector 630 receiving the transmission light TL which has passed through the second pinhole member 620 generates a signal representing intensity of the transmission light TL as the second signal SS.

The microscope 100A includes a first signal processing device 710, a second signal processing device 720, an image generating device 730 and a display device 740. The first signal processing device 710, the second signal processing device 720, the image generating device 730 and the display device 740 are designed as the image generator 700 described with reference to FIG. 1.

The first signal FS is output from the first light detector 530 to the first signal processing device 710. The first signal processing device 710 may perform various signal processes such as a noise removing process, a signal amplifying process and a signal attenuation process for the first signal FS. The first signal FS subjected to predetermined processes by the first signal processing device 710 is output to the image generating device 730. The principles of the present embodiment are not limited to a specific signal process performed by the first signal processing device 710.

The second signal SS is output from the second light detector 630 to the second signal processing device 720. The second signal processing device 720 may perform various signal processes such as a noise removing process, a signal amplifying process, and a signal attenuation process for the second signal SS. The second signal SS subjected to predetermined processes by the second signal processing device 720 is output to the image generating device 730. The principles of the present embodiment are not limited to a specific signal process performed by the second signal processing device 720.

The image generating device 730 generates an image of the sample SMP from the first signal FS processed by the first signal processing device 710 and the second signal SS processed by the second signal processing device 720. The image generating device 730 generates a reflection image of the sample SMP from the first signal FS. The image generating device 730 generates a transmission image of the sample SMP from the second signal SS. The image generating device 730 synthesizes the reflection image and the transmission image to generate a synthetic image.

An image signal representing the synthetic image is output from the image generating device 730 to the display device 740. The display device 740 displays the synthetic image in response to the image signal. An observer may observe the synthetic image displayed on the display device 740 to obtain information about the sample SMP. The display device 740 may be a monitor used in a general personal computer or a general TV set. The principles of the present embodiment are not limited by the display device 740.

Figure 3:
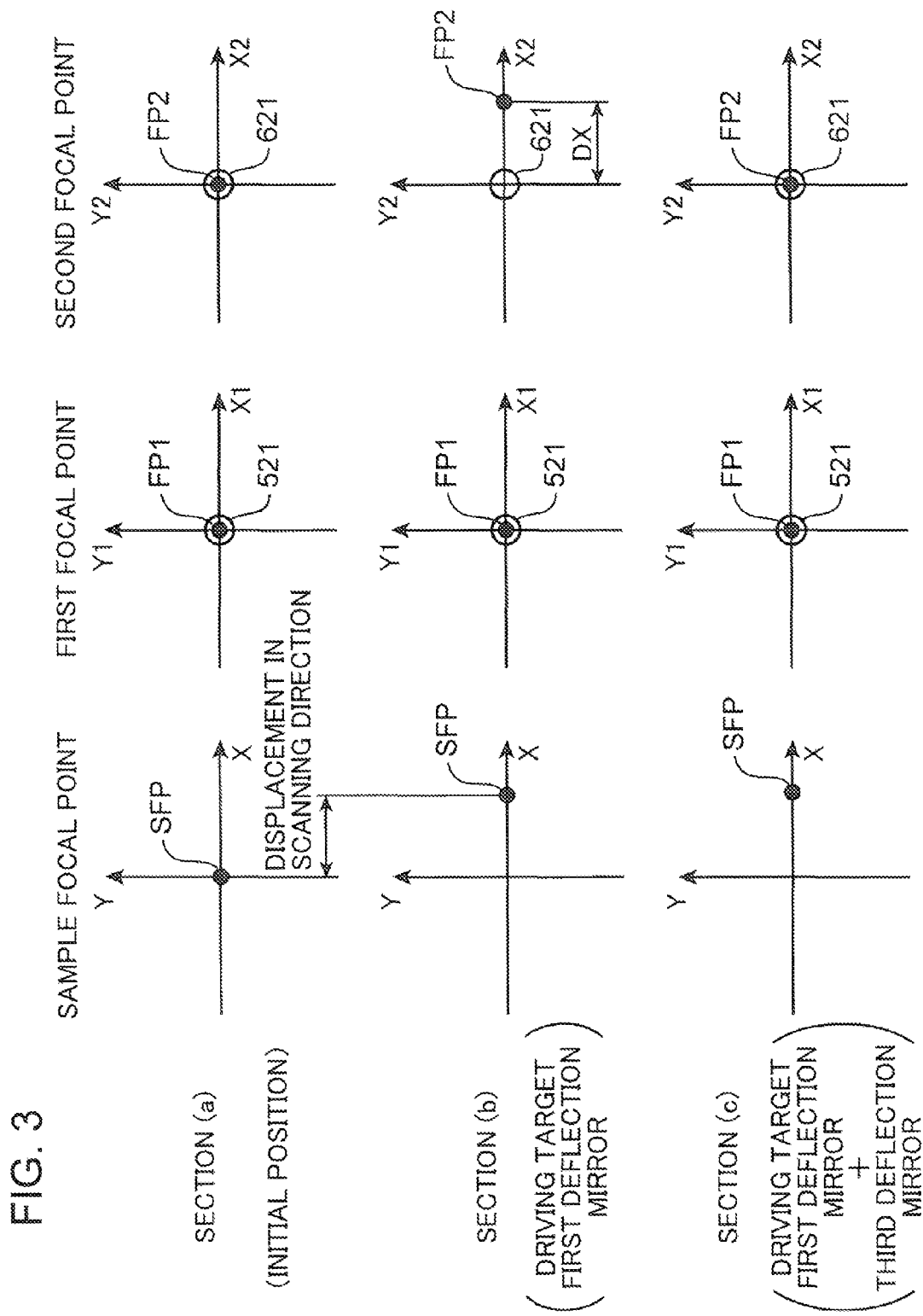
FIG. 3 is to conceptual view showing control of a controller of the confocal microscope depicted in FIG. 2.

FIG. 3 is a conceptual view showing control of the controller 120. The control of the controller 120 is described with reference to FIGS. 2 and 3.

FIG. 3 shows the sample focal point SFP, the first focal point FP1 and the second focal point FP2. With regard to the section (a) of FIG. 3, there are the sample focal point SFP, the first focal point FP1 and the second focal point FP2 at an initial position. The section (b) of FIG. 3 shows movement of the sample focal point SFP, the first focal point FP1 and the second focal point FP2 when the controller 120 rotates only the first deflection mirror 310. The section (c) of FIG. 3 shows movement of the sample focal point SFP, the first focal point FP1 and the second focal point FP2 when the controller 120 rotates the third deflection mirror 410 in synchronization with the rotation of the first deflection mirror 310.

FIG. 3 shows XY coordinates conceptually set on the slide glass 110. The X axis denotes the main scanning direction. The Y axis denotes the sub-scanning direction.

FIG. 3 shows X1Y1 coordinates conceptually set on the first pinhole member 520. The X1 axis corresponds to the aforementioned X axis of the XY coordinates. The Y1 axis corresponds to the aforementioned Y axis of the XY coordinates. The origin of X1Y1 coordinates is set at the center of the first pinhole 521.

FIG. 3 shows X2Y2 coordinates conceptually set on the second pinhole member 620. The X2 axis corresponds to the aforementioned X axis of the XY coordinates. The Y2 axis corresponds to the aforementioned Y axis of the XY coordinates. The origin of X2Y2 coordinates is set at the center of the second pinhole 621.

As shown in the section (a), a condition in which there are the sample focal point SFP, the first focal point FP1 and the second focal point FP2 at the coordinate origin is set as the initial condition. When the controller 120 outputs a driving signal to the first driving motor 315, the first driving motor 315 gives the first deflection mirror 310 a rotational movement at a rotation angle in correspondence to the driving signal. Consequently, the sample focal point SFP moves in the main scanning direction (c.f. the section (b)). In the present embodiment, the first reflector is exemplified by the first deflection mirror 310. The first driving device is exemplified by the first driving motor 315.

As described with reference to FIG. 2, the reflection light RL inversely propagates along the optical path of the laser beam LB emitted from the laser source 210 in the section from the sample focal point SFP to the beam splitter 220. The reflection light RL then passes through the beam splitter 220 and reaches the first pinhole member 520, so that the first focal point FP1 is kept in the first pinhole 521 even under displacement of the sample focal point SFP in the main scanning direction.

On the other hand, a position of the second focal point FP2 is directly affected by the displacement of the sample focal point SFP if the third deflection mirror 410 is stationary since the optical path of the transmission light TL is set independently from the optical path of the laser beam LB and the reflection light RL. Accordingly, as shown in the section (b), the second focal point FP2 deviates from the second pinhole 621. In the section (b), the displacement amount of the second focal point FP2 under a condition of rotating only the first deflection mirror 310 is represented by the sign "DX".

As shown in the section (c), the controller 120 controls the third driving motor 415 so that the displacement amount "DX" is cancelled out. When the third driving motor 415 gives the third deflection mirror 410 a rotational movement under control of the controller 120, the second focal point FP2 is kept in the second pinhole 621. Accordingly, the controller 120 may control the third driving motor 415 to make the displacement of the sample focal point SFP less influential to a position of the second focal point FP2. In the present embodiment, the third reflector is exemplified by the third deflection mirror 410. The third driving device is exemplified by the third driving motor 415.

The driving system formed of the third driving motor 415 and the third deflection mirror 410 may be associated with the driving system formed of the first driving motor 315 and the first deflection mirror 310 to make easy optical settings of the microscope 100A. For example, when an operator adjusting optical settings of the microscope 100A finds a problem in operation of the microscope 100A in the main scanning direction, the operator may finely adjust a relationship between the driving system formed of the first driving motor 315 and the first deflection mirror 310 and the driving system formed of the third driving motor 415 and the third deflection mirror 410. For example, the operator may apply an offset to an electrical signal for driving the first and third driving motors 315, 415. Accordingly, even when there is a positional deviation in the first and third deflection mirrors 310, 410 because of circumferential changes or aging changes, the operator may apply the offset to an electrical signal to appropriately adjust or correct the optical settings of the microscope 100A.

Figure 4:
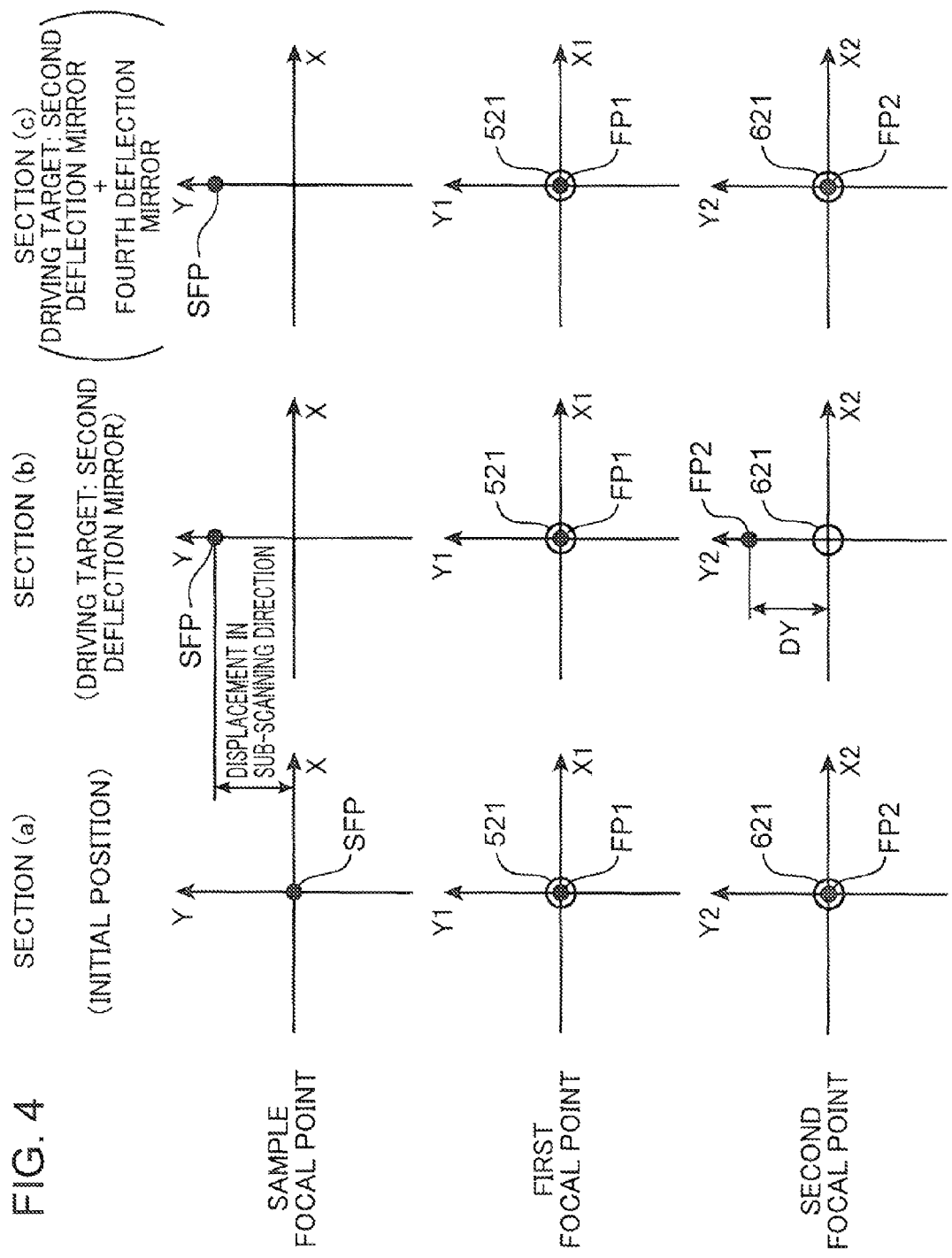
FIG. 4 is a conceptual view showing control of the controller of the confocal microscope depicted in FIG. 2.

FIG. 4 is a conceptual view showing control of the controller 120. The control of the controller 120 is described with reference to FIGS. 2 and 4.

FIG. 4 shows the sample focal point SFP, the first focal point FP1 and the second focal point FP2. With regard to the section (a) of FIG. 4, there are the sample focal point SFP, the first focal point FP1 and the second focal point FP2 at the initial position. The section (b) of FIG. 4 shows movement of the sample focal point SFP, the first focal point FP1 and the second focal point FP2 when the controller 120 rotates only the second deflection mirror 320. The section (c) of FIG. 4 shows movement of the sample focal point SFP, the first focal point FP1 and the second focal point FP2 when the controller 120 rotates the fourth deflection mirror 420 in synchronization with the rotation of the second deflection mirror 320.

FIG. 4 shows XY coordinates conceptually set on the slide glass 110. The X axis denotes the main scanning direction. The Y axis denotes the sub-scanning direction.

FIG. 4 shows X1Y1 coordinates conceptually set on the first pinhole member 520. The X1 axis corresponds to the aforementioned X axis of the XY coordinates. The Y1 axis corresponds to the aforementioned Y axis of the XY coordinates. The origin of X1Y1 coordinates is set at the center of the first pinhole 521.

FIG. 4 shows X2Y2 coordinates conceptually set on the second pinhole member 620. The X2 axis corresponds to the aforementioned X axis of the XY coordinates. The Y2 axis corresponds to the aforementioned Y axis of the XY coordinates. The origin of X2Y2 coordinates is set at the center of the second pinhole 621.

As shown in the section (a), the condition in which there are the sample focal point SFP, the first focal point FP1 and the second focal point FP2 at the coordinate origin is set as the initial condition. When the controller 120 outputs a driving signal to the second driving motor 325, the second driving motor 325 gives the second deflection mirror 320 a rotation by a rotation angle in correspondence to the driving signal. Consequently, the sample focal point SFP moves in the sub-scanning direction (c.f. the section (b)). In the present embodiment, the second reflector is exemplified by the second deflection mirror 320. The second driving device is exemplified by the second driving motor 325.

As described with reference to FIG. 2, the reflection light RL inversely propagate along the optical path of the laser beam LB emitted from the laser source 210 in the section from the sample focal point SFP to the beam splitter 220. The reflection light RL then passes through the beam splitter 220 and reaches the first pinhole member 520, so that the first focal point FP1 is kept in the first pinhole 521 even under displacement of the sample focal point SFP in the sub-scanning direction.

On the other hand, a position of the second focal point FP2 is directly affected by the displacement of the sample focal point SFP if the fourth deflection mirror 420 is stationary since the optical path of the transmission light TL is set independently from the optical path of the laser beam LB and the reflection light RL. Accordingly, as shown in the section (b), the second focal point FP2 deviates from the second pinhole 621. With regard to the section (b), the displacement amount of the second focal point FP2 under the condition of rotating only the second deflection mirror 320 is represented by the sign "DY".

As shown in the section (c), the controller 120 controls the fourth driving motor 425 to offset the displacement amount "DY". When the fourth driving motor 425 gives the fourth deflection mirror 420 a rotation under control of the controller 120, the second focal point FP2 is kept in the second pinhole 621. Accordingly, the controller 120 controls the fourth driving motor 425 to make the displacement of the sample focal point SFP less influential to a position of the second focal point FP2. In the present embodiment, the fourth reflector is exemplified by the fourth deflection mirror 420. The fourth driving device is exemplified by the fourth driving motor 425.

The driving system formed of the fourth driving motor 425 and the fourth deflection mirror 420 may be associated with the driving system formed of the second driving motor 325 and the second deflection mirror 320 to make easy optical settings of the microscope 100A. For example, when an operator adjusting settings of the microscope 100A finds failures in operation of the microscope 100A in the sub-scanning direction, the operator may finely adjust a relationship between the driving system formed of the second driving motor 325 and the second deflection mirror 320 and the driving system formed of the fourth driving motor 425 and the fourth deflection mirror 420. For example, the operator may apply an offset to an electrical signal for driving the second and fourth driving motors 325, 425. Accordingly, even when there is a positional deviation in the second and fourth deflection mirrors 320, 420 because of circumferential changes or aging changes, the operator may apply an offset to the electrical signal to appropriately adjust or correct the optical settings of the microscope 100A.

As described above, the design principle of the present embodiment may make the optical settings easy. For example, when the sample SMP has optical characteristics which cause birefringence, the operator may quickly adjust optical settings of the microscope 100A to be suitable for the optical characteristics of the sample SMP.

Third Embodiment

When there is an excessively large difference in brightness between a reflection image and a transmission image, it may be difficult for an observer to obtain information about a sample from a synthetic image. When the sample has high transmissivity, the transmission image is likely to be brighter than the reflection image is. When the sample has high reflectivity, the reflection image is likely to be brighter than the transmission image is. Techniques of decreasing the difference in brightness between the reflection image and the transmission image are described in the third embodiment.

Figure 5:
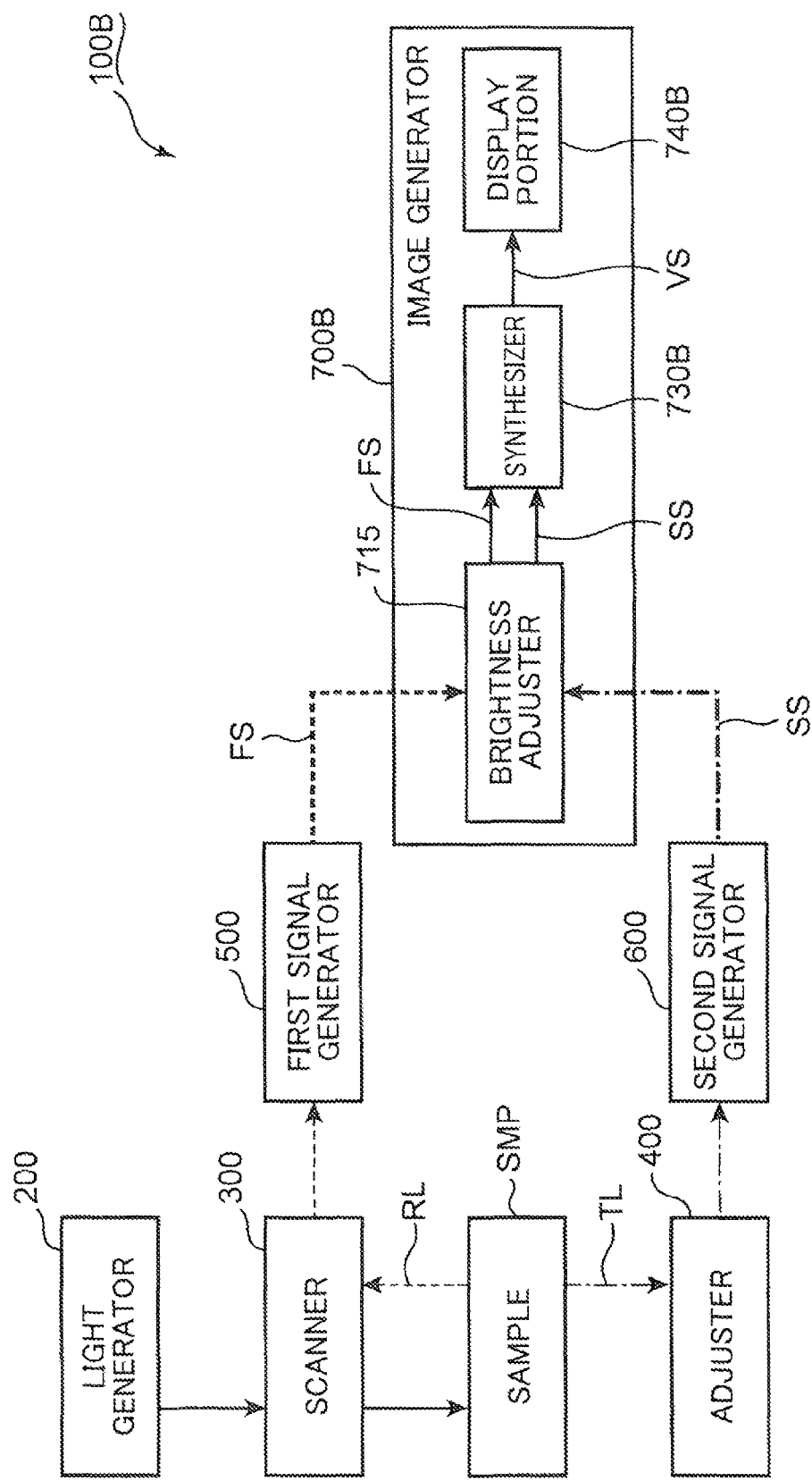
FIG. 5 is a schematic block diagram of a confocal microscope according to the third embodiment.

FIG. 5 is a schematic block diagram of a confocal microscope (hereinafter, referred to as a microscope 100B) according to the third embodiment. The microscope 100B is described with reference to FIG. 5. The common reference numerals and signs between the first and third embodiments are applied to elements having the same functions as the first embodiment. Accordingly, the description in the first embodiment is applicable to these elements.

Like the first embodiment, the microscope 100B includes the light generator 200, the scanner 300, the adjuster 400, the first signal generator 500 and the second signal generator 600. The microscope 100B further includes an image generator 700B. The image generator 700B includes a brightness adjuster 715, a synthesizer 730B and a display portion 740B.

The first signal FS is output from the first signal generator 500 to the brightness adjuster 715. The second signal SS is output from the second signal generator 600 to the brightness adjuster 715. The brightness adjuster 715 performs a process for reducing a difference in brightness between a reflection image represented by the first signal FS and a transmission image represented by the second signal SS. The brightness adjuster 715 may execute a program designed to reduce the brightness difference. Alternatively, the brightness adjuster 715 may perform an amplification process or an attenuation process of the first signal FS. Further alternatively, the brightness adjuster 715 may perform an amplification process or an attenuation process of the second signal SS. The principles of the present embodiment are not limited to a specific process performed by the brightness adjuster 715. Various existing techniques for reducing the difference in brightness between the reflection image and the transmission image may be applied to the brightness adjuster 715. In the present embodiment, the brightness adjustment process is exemplified by the process performed by the brightness adjuster 715.

After the aforementioned process is executed by the brightness adjuster 715, the first and second signals FS, SS are output to the synthesizer 730B. The synthesizer 730B uses the first and second signals FS, SS to synthesize the reflection image and the transmission image for generating an image signal VS. The image signal VS is output from the synthesizer 730B to the display portion 740B. The display portion 740B displays the synthetic image in response to the image signal VS. As described above, since the brightness adjuster 715 reduces the difference in brightness between the reflection image and the transmission image, an observer may easily grasp a condition of the sample SMP from the synthetic image which is displayed on the display portion 740B.

Fourth Embodiment

In many cases, biological tissues or cells have low reflectivity. Accordingly, intensity of a signal generated from the reflection light is likely to be low. When the reflection image is generated from a signal with low intensity, there is low brightness of the reflection image. Techniques for increasing the brightness of the reflection image are described in the fourth embodiment.

Figure 6:
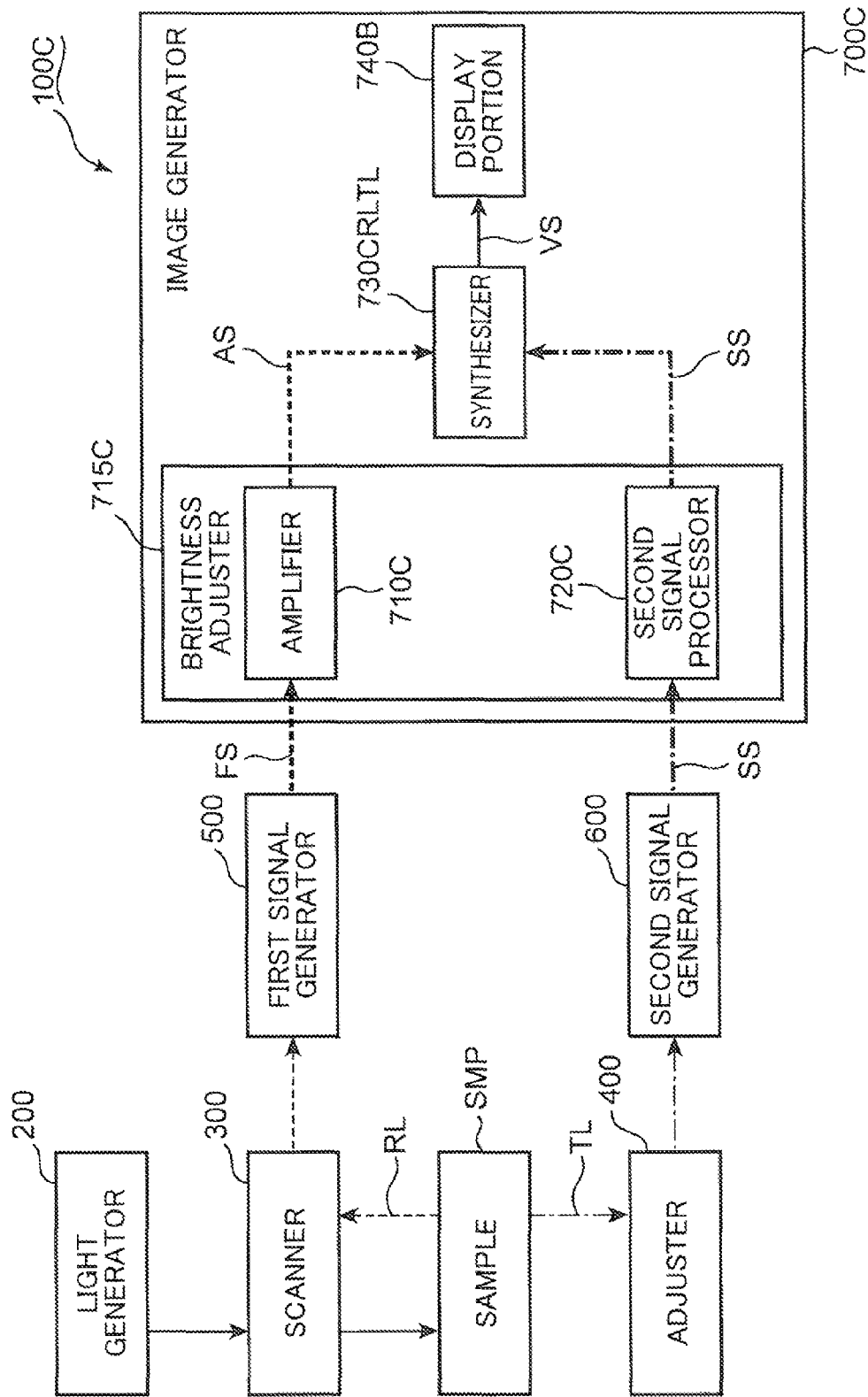
FIG. 6 is a schematic block diagram of a confocal microscope according to the fourth embodiment.

FIG. 6 is a schematic block diagram of a confocal microscope (hereinafter, referred to as a microscope 100C) according to the fourth embodiment. The microscope 100C is described with reference to FIGS. 2 and 6. The common reference numerals and signs between the third and fourth embodiments are applied to elements having the same functions as the third embodiment. Accordingly, the description in the third embodiment is applicable to these elements.

Like the third embodiment, the microscope 100C includes the light generator 200, the scanner 300, the adjuster 400, the first signal generator 500 and the second signal generator 600. The microscope 100C further includes an image generator 700C.

Like the third embodiment, the image generator 700C includes the display portion 740B. The image generator 700C further includes a brightness adjuster 715C and a synthesizer 730C.

The brightness adjuster 715C includes an amplifier 710C and a second signal processor 720C. The first signal FS is output from the first signal generator 500 to the amplifier 710C. The amplifier 710C amplifies the first signal FS to generate an amplified signal AS. The amplified signal AS is output from the amplifier 710C to the synthesizer 730C. The second signal SS is output from the second signal generator 600 to the second signal processor 720C. The second signal processor 720C may perform noise removal or other necessary processes for the second signal SS. The second signal SS processed by the second signal processor 720C is output to the synthesizer 730C.

The synthesizer 730C uses the amplified signal AS and the second signal SS to synthesize the reflection image and the transmission image for generating an image signal VS. The image signal VS is output from the synthesizer 730C to the display portion 740B. The display portion 740B displays the synthetic image in response to the image signal VS. As described above, since the amplifier 710C amplifies the first signal FS, there is a decreased difference in brightness between the reflection image and the transmission image. Therefore, an observer may easily grasp a condition of the sample SMP from the synthetic image displayed on the display portion 740B.

The principles of the present embodiment may be utilized in the design of the second embodiment. The first signal processing device 710 described with reference to FIG. 2 may function as the amplifier 710C. The second signal processor 720C may correspond to the second signal processing device 720 described with reference to FIG. 2. The synthesizer 730C may correspond to the image generating device 730. The display portion 740B may correspond to the display device 740.

Fifth Embodiment

In many cases, biological tissues or cells have high transmissivity. Accordingly, intensity of a signal generated from the transmission light is likely to be high. When the transmission image is generated from a signal with excessively high intensity, the transmission image is excessively bright. Consequently, it may be difficult for an observer to grasp a sample condition from the synthetic image. Techniques for decreasing brightness of the transmission image are described in the fifth embodiment.

Figure 7:
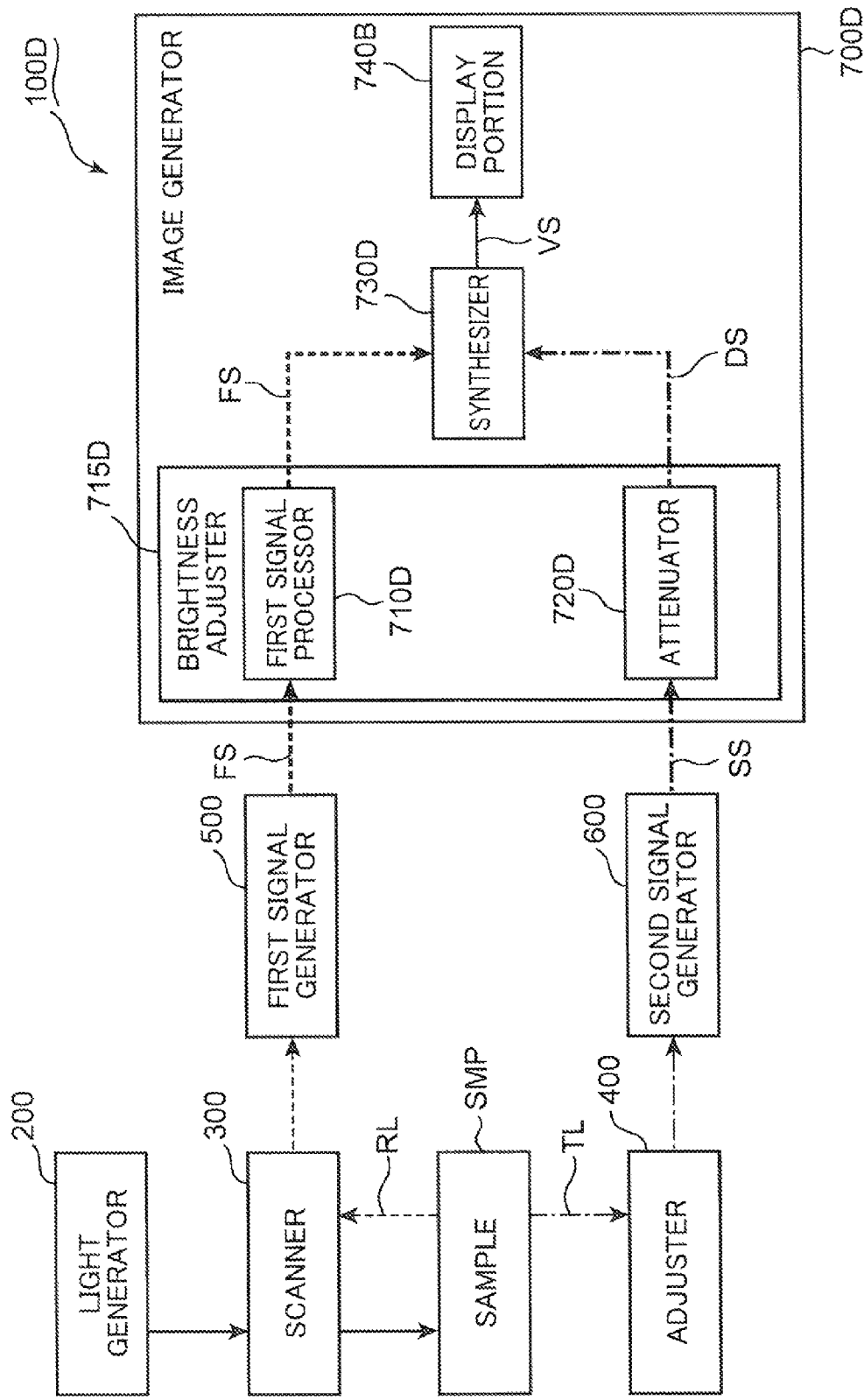
FIG. 7 is a schematic block diagram of a confocal microscope according to the fifth embodiment.

FIG. 7 is a schematic block diagram of a confocal microscope (hereinafter, referred to as a microscope 100D) according to the fifth embodiment. The microscope 100D is described with reference to FIGS. 2 and 7. The common reference numerals and signs between the third and fifth embodiments are applied to elements having the same functions as the third embodiment. Accordingly, the description in the third embodiment is applicable to these elements.

Like the third embodiment, the microscope 100D includes the light generator 200, the scanner 300, the adjuster 400, the first signal generator 500 and the second signal generator 600. The microscope 100D further includes an image generator 700D.

Like the third embodiment, the image generator 700D includes the display portion 740B. The image generator 700D further includes a brightness adjuster 715D and a synthesizer 730D.

The brightness adjuster 715D includes a first shawl processor 710D and an attenuator 720D. The first signal FS is output from the first signal generator 500 to the first signal processor 710D. The first signal processor 710D may perform noise removal or other necessary processes for the first signal FS. The first signal FS processed by the first signal processor 710D is output to the synthesizer 730D. The second signal SS is output from the second signal generator 600 to the attenuator 720D. The attenuator 720D attenuates the second signal SS to generate an attenuated signal DS. The attenuated signal DS is output from the attenuator 720D to the synthesizer 730D.

The synthesizer 730D uses the first signal FS and the attenuated signal DS to synthesize the reflection image and the transmission image for generating an image signal VS. The image signal VS is output from the synthesizer 730D to the display portion 740B. The display portion 740B displays the synthetic image in response to the image signal VS. As described above, since the attenuator 720D attenuates the second signal SS, there is a decreased difference in brightness between the reflection image and the transmission image. Therefore, an observer may easily grasp a condition of the sample SMP from the synthetic image displayed on the display portion 740B.

The principles of the present embodiment may be utilized in the design of the second Embodiment. The second signal processing device 720 described with reference to FIG. 2 may function as the attenuator 720D. The first signal processor 710D may correspond to the first signal processing device 710 described with reference to FIG. 2. The synthesizer 730D may correspond to the image generating device 730. The display portion 740B may correspond to the display device 740.

Sixth Embodiment

When a confocal microscope has the amplification function described in the context of the fourth embodiment and the attenuation function described in the context of the fifth embodiment, an observer may accurately grasp characteristics of a sample including a low transmissivity area and a high transmissivity area. Techniques for generating a synthetic image of a sample including a low transmissivity area and a high transmissivity area are described in the sixth embodiment.

Figure 8:
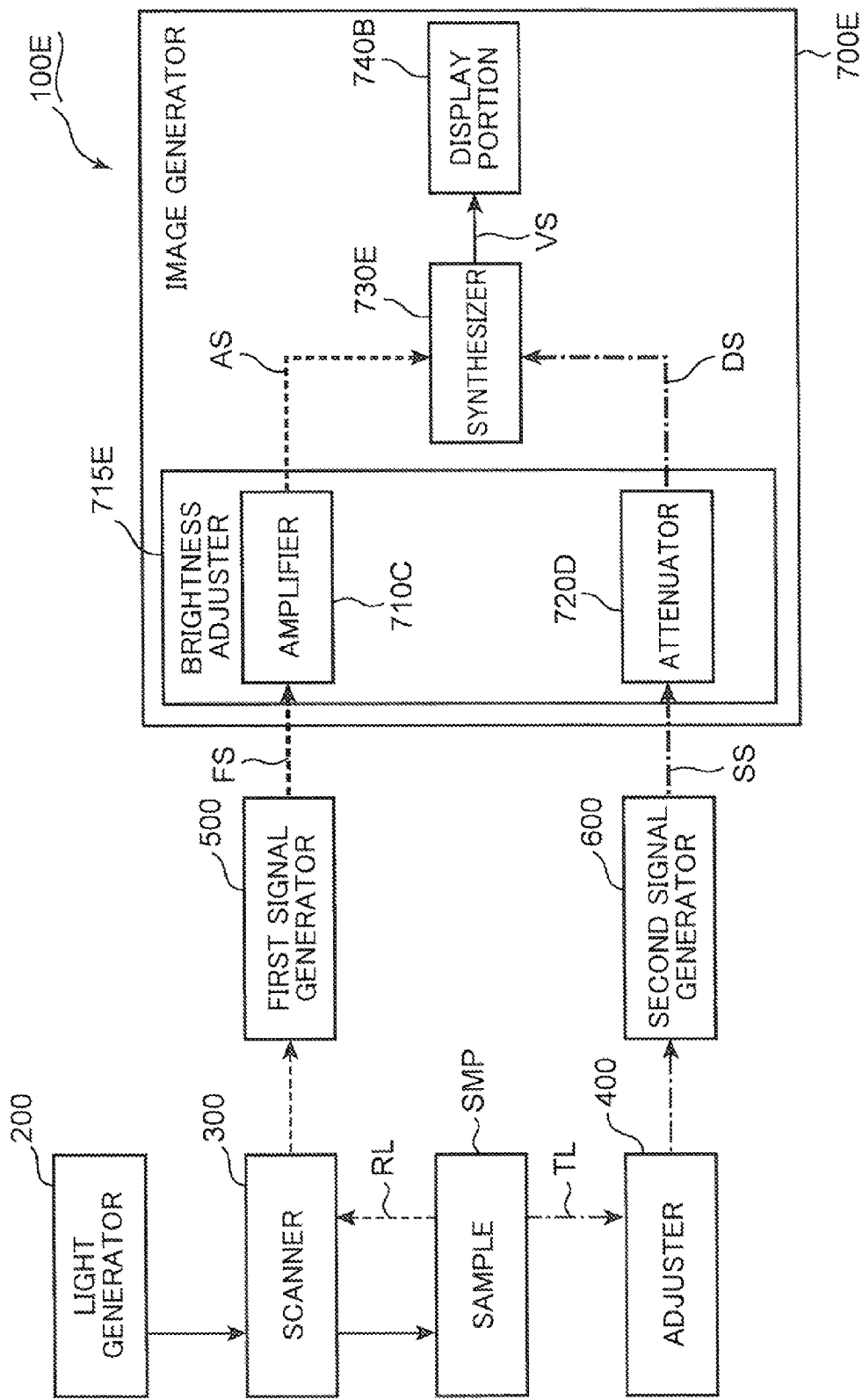
FIG. 8 is a schematic block diagram of a confocal microscope according to the sixth embodiment.

FIG. 8 is a schematic block diagram of a confocal microscope (hereinafter, referred to as a microscope 100E) according to the sixth embodiment. The microscope 100E is described with reference to FIGS. 2 and 8. The common reference numerals and signs among the fourth to sixth embodiments are applied to elements having the same functions as the fourth or fifth embodiment. Accordingly, the description in the fourth or fifth embodiment is applicable to these elements.

Like the fourth and fifth embodiments, the microscope 100E includes the light generator 200, the scanner 300, the adjuster 400, the first and second signal generators 500, 600. The microscope 100E further includes an image generator 700E.

Like the fourth and fifth embodiments, the image generator 700E includes the display portion 740B. The image generator 700E further includes a brightness adjuster 715E and a synthesizer 730E.

Like the fourth embodiment, the brightness adjuster 715E includes the amplifier 710C. Like the fifth embodiment, the brightness adjuster 715E includes the attenuator 720D. The first signal FS is output from the first signal generator 500 to the amplifier 710C. The amplifier 710C amplifies the first signal FS to generate an amplified signal AS. The amplified signal AS is output from the amplifier 710C to the synthesizer 730E. The second signal SS is output from the second signal generator 600 to the attenuator 720D. The attenuator 720D attenuates the second signal SS to generate an attenuated signal DS. The attenuated signal DS is output from the attenuator 720D to the synthesizer 730E.

The synthesizer 730E uses the amplified signal AS and the attenuated signal DS to synthesize the reflection image and the transmission image for generating an image signal VS. The image signal VS is output from the synthesizer 730E to the display portion 740B. The display portion 740B displays the synthetic image in response to the image signal VS.

The principles of the present embodiment may be utilized to the design of the second embodiment. The first signal processing device 710 described with reference to FIG. 2 may function as the amplifier 710C. The second signal processing device 720 described with reference to FIG. 2 may function as the attenuator 720D. The synthesizer 730D may correspond to the image generating device 730. The display portion 740B may correspond to the display device 740.

Figure 9:
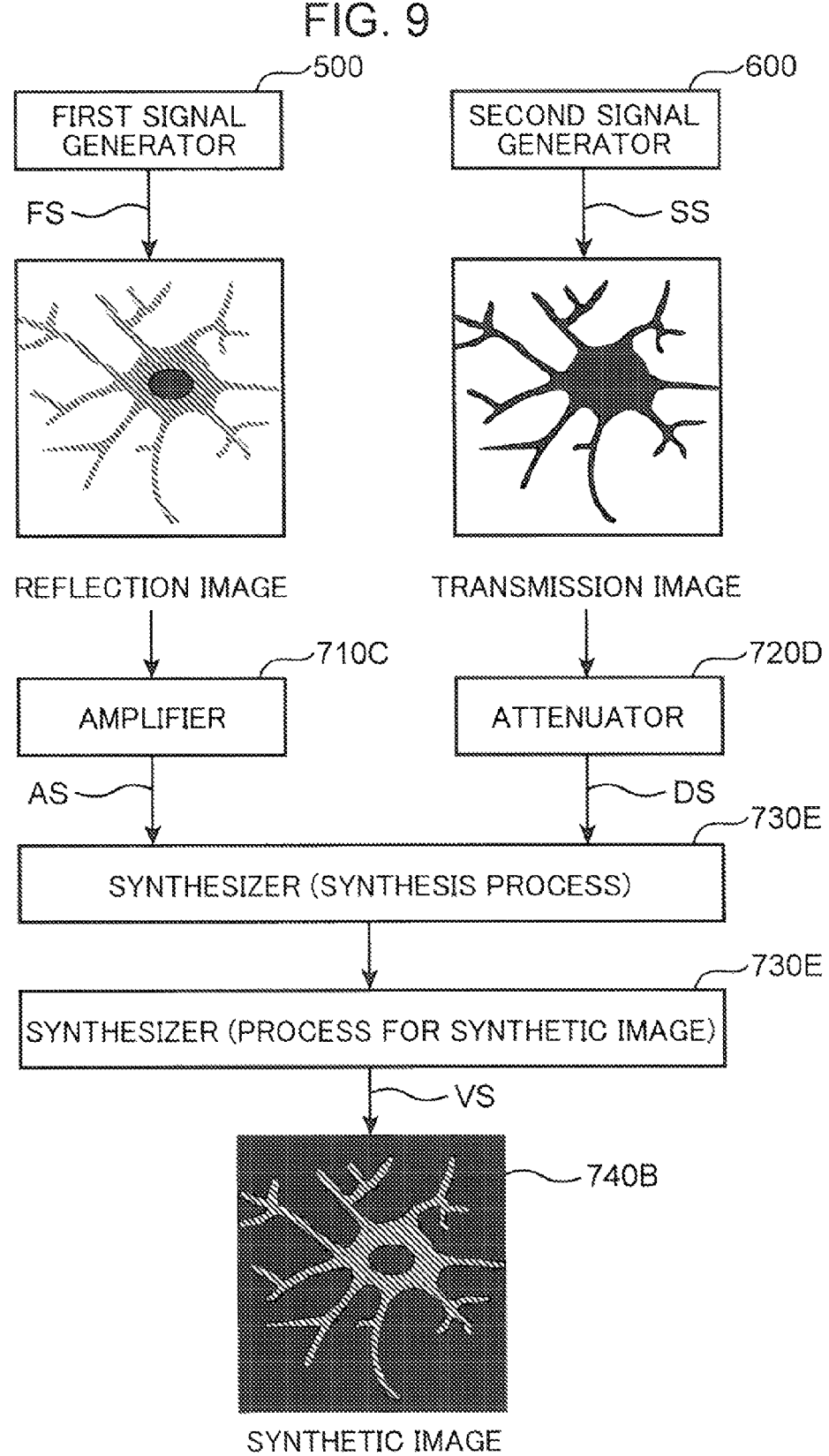
FIG. 9 is a schematic flowchart showing a concept of an image synthesizing process performed by the confocal microscope depicted in FIG. 8.

FIG. 9 is a schematic flowchart showing a concept of an image synthesizing process. The image synthesizing process is described with reference to FIGS. 8 and 9.

As described above, the first signal FS is output from the first signal generator 500 to the amplifier 710C. The second signal SS is output from the second signal generator 600 to the attenuator 720D. The first signal FS includes data about the reflection image represented by the reflection light RL from the sample SMP. The second signal SS includes data about the transmission image represented by the transmission light TL from the sample SMP. During the scanning operation of the microscope 100E, the amplifier 710C receives the first signal FS output from the first signal generator 500, and generates the reflection image. During the scanning operation of the microscope 100E, the attenuator 720D receives the second signal SS output from the second signal generator 600, and generates the transmission image.

FIG. 9 shows the reflection image and the transmission image of the biological cell used as the sample SMP. The biological cell has low reflectivity as a whole. Accordingly, contrast of the reflection image is likely to be low. On the other hand, since the reflection image is likely to reflect a local increase in internal or surficial reflectivity of the biological cell, the reflection image may give an observer a lot of information about the internal or surficial state of the biological cell. Since the biological cell has low reflectivity as a whole, the first signal FS is weak. When the first signal FS is amplified, there may be a reflection image with emphasized internal or surficial characteristics of the biological cell.

Since the transmission light TL is strong when the sample focal point from which the transmission light TL is emitted is formed at a position apart from the sample SMP, the second signal SS is enhanced in strength. On the other hand, the transmission light TL becomes weak when the sample focal point from which the transmission light TL is emitted is formed in the sample SMP since the sample SMP absorbs or scatters light. The aforementioned characteristics of the transmission light TL contribute to showing the outline of the biological cell with high contrast. With attenuation of the second signal SS, there is a decreased difference in brightness between the reflection image and the transmission image, so that the transmission image may clearly represent the outline of the biological cell.

The aforementioned signal process is useful to observe biological tissues or cells in a living state. In short, as a result of the aforementioned signal process, an observer may non-invasively observe the biological tissues or cells without staining. Under the principles of the present embodiment, the transmission image may draw a clear outline of the biological tissues or cells without adding fluorescent substances to the biological tissues or cells. In addition, the reflection image may clearly represent an internal or surficial state of the biological tissues or cells.

When there is low reflectivity of the sample SMP (e.g. a biological cell), there is a large difference in contrast between the reflection image and the transmission image. The amplifier 710C and the attenuator 720D amplify and attenuate the first and second signals FS, SS to achieve an appropriate contrast ratio between the reflection image and the transmission image. Consequently, the synthetic image generated by the synthesizer 730E may clearly represent the outline and the surficial and internal conditions of the sample SMP.

When the observer observes the cell in the living condition without adding fluorescent pigment, a difference in refractive index between the cell and the air determines a rate of light amount between the reflection image and the transmission image. When the refractive index of the cell is a value of "1.335" and the cell is surrounded with the air, the light amount of the transmission image is about 50 times as large as the reflection image.

The refractive index of the biological cell depends on a factor such as moisture content or density in the biological cell, so that the reflection image becomes 10 to 100 times as dark as the transmission image. Accordingly, when the amplifier 710C amplifies the first signal FS by 10 to 100 times to generate an amplified signal AS, a reflection image may be 10 to 100 times as bright as the reflection image represented by the first signal FS. When the reflection image represented by the amplified signal AS is used, there is a decreased difference in contrast between the reflection image and the transmission image. Therefore, a resultant synthetic image becomes suitable for observation of the sample SMP.

A signal amplification rate of the amplifier 710C and a signal attenuation rate of the attenuator 720D depend on optical characteristics of the sample SMP. Therefore, the principles of the present embodiment are not limited to a specific signal amplification rate and a specific signal attenuation rate.

As described above, the amplified signal AS is output from the amplifier 710C to the synthesizer 730E. The attenuated signal DS is output from the attenuator 720D to the synthesizer 730E. The synthesizer 730E uses the amplified signal AS and the attenuated signal DS to synthesize the reflection image and the transmission image. The synthesizer 730E may use the amplified signal AS and the attenuated signal DS to perform an addition process and/or a subtraction process. The synthesizer 730E may use the amplified signal AS and the attenuated signal DS to perform a logical operation such as logical AND, logical OR or exclusive OR. The synthesizer 730E shown in FIG. 9 reverses black and white parts of the transmission image. The synthesizer 730E then synthesizes the reverse-processed transmission image with the reflection image. The synthetic image may be obtained by various operation techniques. Accordingly, the principles of the present embodiment are not limited to a specific operation process performed by the synthesizer 730E.

The synthesizer 730E may further perform various processes for the synthetic image. The synthesizer 730E may perform a filtering process for the synthetic image. As a result of the filtering process, there is improved visibility of the synthetic image.

The synthesizer 730E generates an image signal VS representing the synthetic image. The image signal VS is output from the synthesizer 730E to the display portion 740B. The display portion 740B displays the synthetic image in response to the image signal VS.

The techniques for generating the synthetic image described with reference to FIG. 9 are exemplary. Accordingly, a part of various processes described with reference to FIG. 9 may be omitted. For example, the reflection image and the transmission image may not be generated. The image generator 700E may process the first and second signals FS, SS without generating the reflection image and the transmission image to generate the synthetic image. In FIG. 9, the image processes up to the synthesizing process are performed in parallel. However, the principles of the present embodiment are not limited to a specific process sequence of the image synthesis. For example, the image processes up to the synthesizing process may be performed in series.

Seventh Embodiment

An inclination of an optical path of emission light which is emitted from a light source portion may be appropriately used for synchronous control between a scanner and an adjuster. Techniques for synchronously controlling the scanner and the adjuster by using the inclination of the optical path of the emission light emitted from the light source portion are described in the seventh embodiment.

Figure 10:
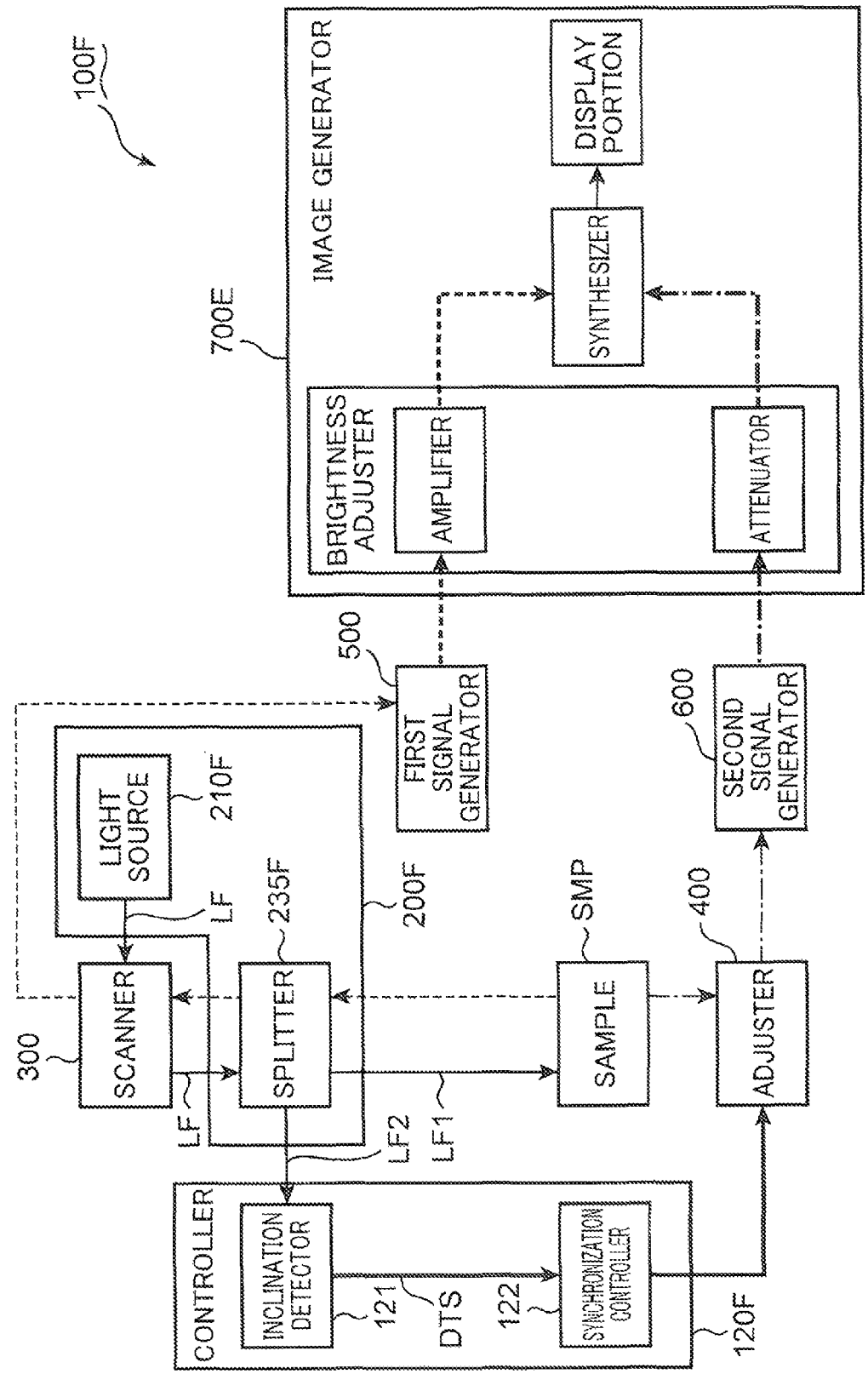
FIG. 10 is a schematic block diagram of a confocal microscope according to the seventh embodiment.

FIG. 10 is a schematic block diagram of a confocal microscope (hereinafter, referred to as a microscope 100F) according to the seventh embodiment. The microscope 100F is described with reference to FIG. 10. The common reference numerals and signs between the sixth and seventh embodiments are applied to elements having the same functions as the sixth embodiment. Accordingly, the description in the sixth embodiment is applicable to these elements.

Like the sixth embodiment, the microscope 100F includes the scanner 300, the adjuster 400, the first signal generator 500, the second signal generator 600 and the image generator 700E. The microscope 100F further includes a light generator 200F and a controller 120F.

The light generator 200F includes a light source 210F and a splitter 235F. The light source 210F mats a light flux LF to the scanner 300. The splitter 235F is situated on an optical path directed from the scanner 300 to the sample SMP. The light flux LF passing through the scanner 300 arrives, at the splitter 235F. The splitter 235F splits the light flux LF into a light flux LF1 directed to the sample SMP and a light flux LF2 directed to the controller 120F.

The controller 120F includes an inclination detector 121 and a synchronization controller 122. The inclination detector 121 detects en inclination of the optical path of the light flux LF2. The inclination detector 121 then generates a detection signal DTS representing the inclination of the optical path of the light flux LF2. The detection signal DTS is output from the inclination detector 121 to the synchronization controller 122. The synchronization controller 122 synchronously controls the scanner 300 and the adjuster 400 in response to the detection signal DTS. Under the synchronous control by the synchronization controller 122, the scanner 300 and the adjuster 400 may perform the operations described in the context of the second embodiment. In the present embodiment, the emission light is exemplified by the light fluxes LF, LF1, LF2.

Figure 11:
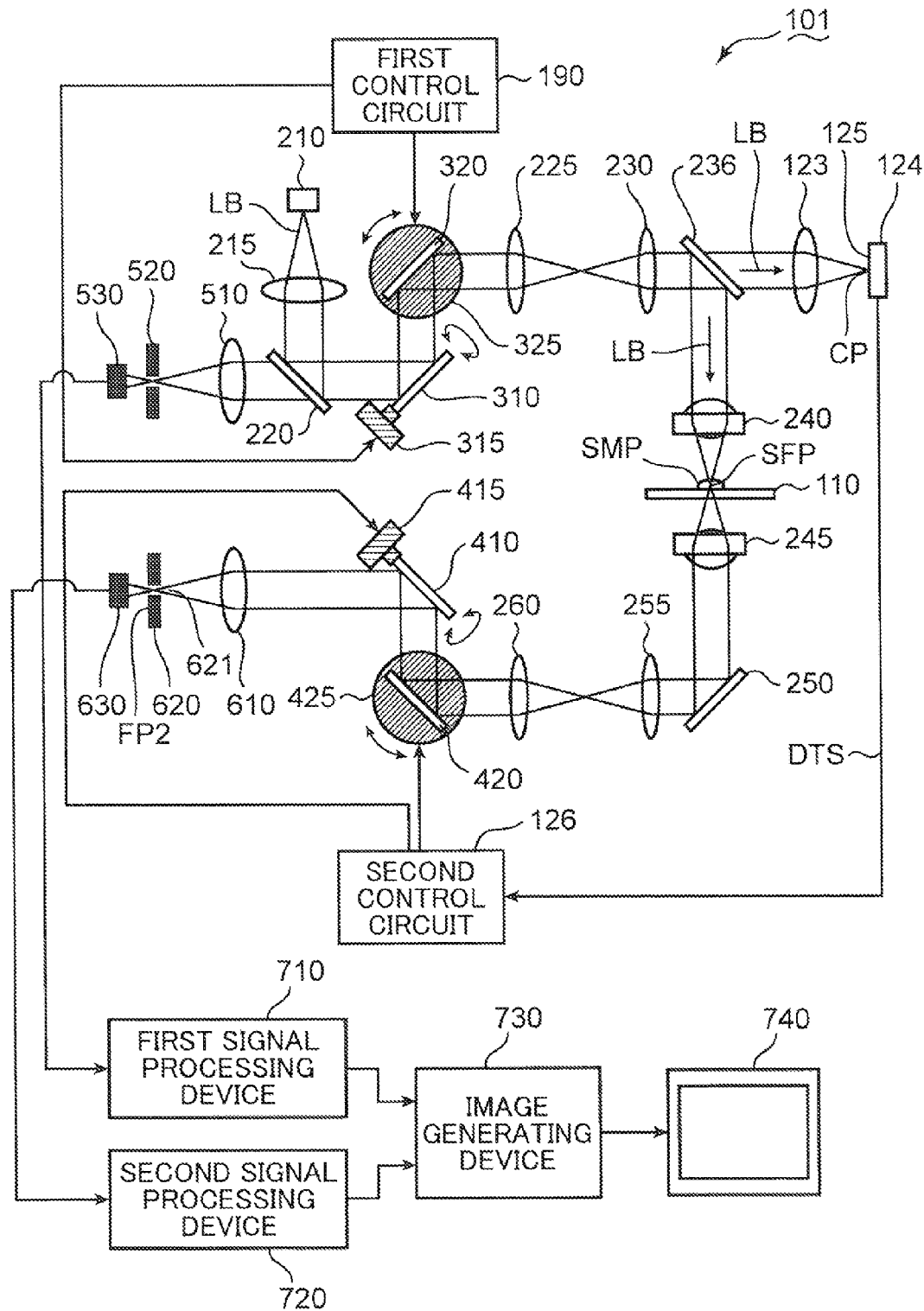
FIG. 11 is a schematic view of an exemplificative confocal microscope designed on the basis of the block diagram of FIG. 10.

FIG. 11 is a schematic view of an exemplary confocal microscope (hereinafter, referred to as a microscope 101) designed on the basis of the block diagram of FIG. 10. The microscope 101 is described with reference to FIGS. 10 and 11. The common reference numerals and signs between the second and seventh embodiments are applied to elements having the same functions as the second embodiment. Accordingly, the description in the second embodiment is applicable to these elements.

Like the second embodiment, the microscope 101 includes the laser source 210, the collimator lens 215, the beam splitter 220, the relay lenses 225, 230, the object lens 240, the collimator lens 245, the reflection mirror 250 and the relay lenses 255, 260. The microscope 101 further includes a mirror 236. The mirror 236 reflects a part of the laser beam LB to the object lens 240, and allows passage of the other part of the laser beam LB. The laser source 210, the collimator lenses 215, 245, the beam splitter 220, the relay lenses 225, 230, 255, 260, the mirror 236, the object lens 240 and the reflection mirror 250 are designed as the light generator 200F described with reference to FIG. 10. The laser source 210 corresponds to the light source 210F described with reference to FIG. 10. The mirror 236 corresponds to the splitter 235F described with reference to FIG. 10.

Like the second embodiment, the microscope 101 further includes the first and second deflection mirrors 310, 320 and the first and second driving motors 315, 325. The first and second deflection mirrors 310, 320 and the first and second driving motors 315, 325 are designed as the scanner 300 described with reference to FIG. 10.

Like the second embodiment, the microscope 101 further includes the slide glass 110. An observer may place the sample SMP on the slide glass 110.

Like the second embodiment, the microscope 101 further includes the first detection lens 510, the first pinhole member 520 and the first light detector 530. The first detection lens 510, the first pinhole member 520 and the first light detector 530 are designed as the first signal generator 500 described with reference to FIG. 10.

Like the second embodiment, the microscope 101 further includes the third and fourth deflection mirrors 410, 420 and the third and fourth driving motors 415, 425. The third and fourth deflection mirrors 410, 420 and the third and fourth driving motors 415 are designed as the adjuster 400 described with reference to FIG. 10.

Like the second embodiment, the microscope 101 further includes the second detection lens 610, the second pinhole member 620 and the second light detector 630. The second detection lens 610, the second pinhole member 620 and the second light detector 630 are designed as the second signal generator 600 described with reference to FIG. 10.

Like the second embodiment, the microscope 101 further includes the first and second signal processing devices 710, 720, the image generating device 730 and the display device 740. The first and second signal processing devices 710, 720, the image generating device 730 and the display device 740 are designed as the image generator 70011 described with reference to FIG. 10.

The microscope 101 further includes a first control circuit 190. The first control circuit 190 controls the first and second driving motors 315, 325. The first and second driving motors 315, 325 are operated under control of the first control circuit 190 to displace the sample focal point SFP in the main scanning direction and the sub-scanning direction.

The microscope 101 further includes a condensing lens 123 and a light detector 124. The light detector 124 includes a photo reception surface 125 facing the condensing lens 123. The condensing lens 123 condenses the laser beam LB passing through the mirror 236 to form a condensing point CP on the photoreception surface 125.

While the first and second driving motors 315, 325 are operated under control of the first control circuit 190, there is a change in inclination of the optical path of the laser beam LB formed between the mirror 236 and the photo reception surface 125. The condensing point CP on the photo reception surface 125 changes in position in response to the inclination of the optical path of the laser beam LB formed between the mirror 236 and the photo reception surface 125. The light detector 124 generates a detection signal DTS in correspondence to the position of the condensing point CP. Accordingly, the detection signal DTS may contain information about the inclination of the optical path of the laser beam LB formed between the mirror 236 and the photo reception surface 125. The condensing lens 123 and the light detector 124 are designed as the inclination detector 121 described with reference to FIG. 10.

The microscope 101 includes a second control circuit 126. The detection signal DTS is output from the light detector 124 to the second control circuit 126. The second control circuit 126 controls the third and fourth driving motors 415, 425 in response to the detection signal DTS. The second control circuit 126 is designed as the synchronization controller 122 described with reference to FIG. 10.

An operator doing initial adjustment to the microscope 101 appropriately adjusts a relationship between a control signal output from the first control circuit 190 and an inclination angle of the first deflection mirror 310, and a relationship between the control signal output from the first control circuit 190 and an inclination angle of the second deflection mirror 320. However, these relationships may change during usage of the microscope 101 for a long period (e.g. mechanical vibration or misalignment of rotation shafts of the first and second deflection mirrors 310, 320). The change in mechanical or optical settings of the first and second deflection mirrors 310, 320 is reflected to the inclination of the optical path of the laser beam LB formed between the mirror 236 and the photo reception surface 125. Since the second control circuit 136 uses the detection signal DTS representing the inclination of the optical path of the laser beam LB to control the third and fourth driving motors 415, 425, the second focal point FP2 is appropriately kept in the second pinhole 621.

Eighth Embodiment

According to the seventh embodiment, the emission light emitted from the light source portion is split. The adjuster is controlled in response to the detection signal representing the inclination of the optical path of the split emission light. Accordingly, the operator adjusting optical settings of the confocal microscope may adjust the optical settings of the adjuster on the basis of the optical system forming the optical paths of the reflection light and the emission light. Consequently, the operator may easily and appropriately adjust the optical settings of the confocal microscope. The detection signal may be generated by using the transmission light. Techniques of synchronously controlling a scanner and an adjuster by using an inclination of an optical path of transmission light are described in the eighth embodiment.

Figure 12:
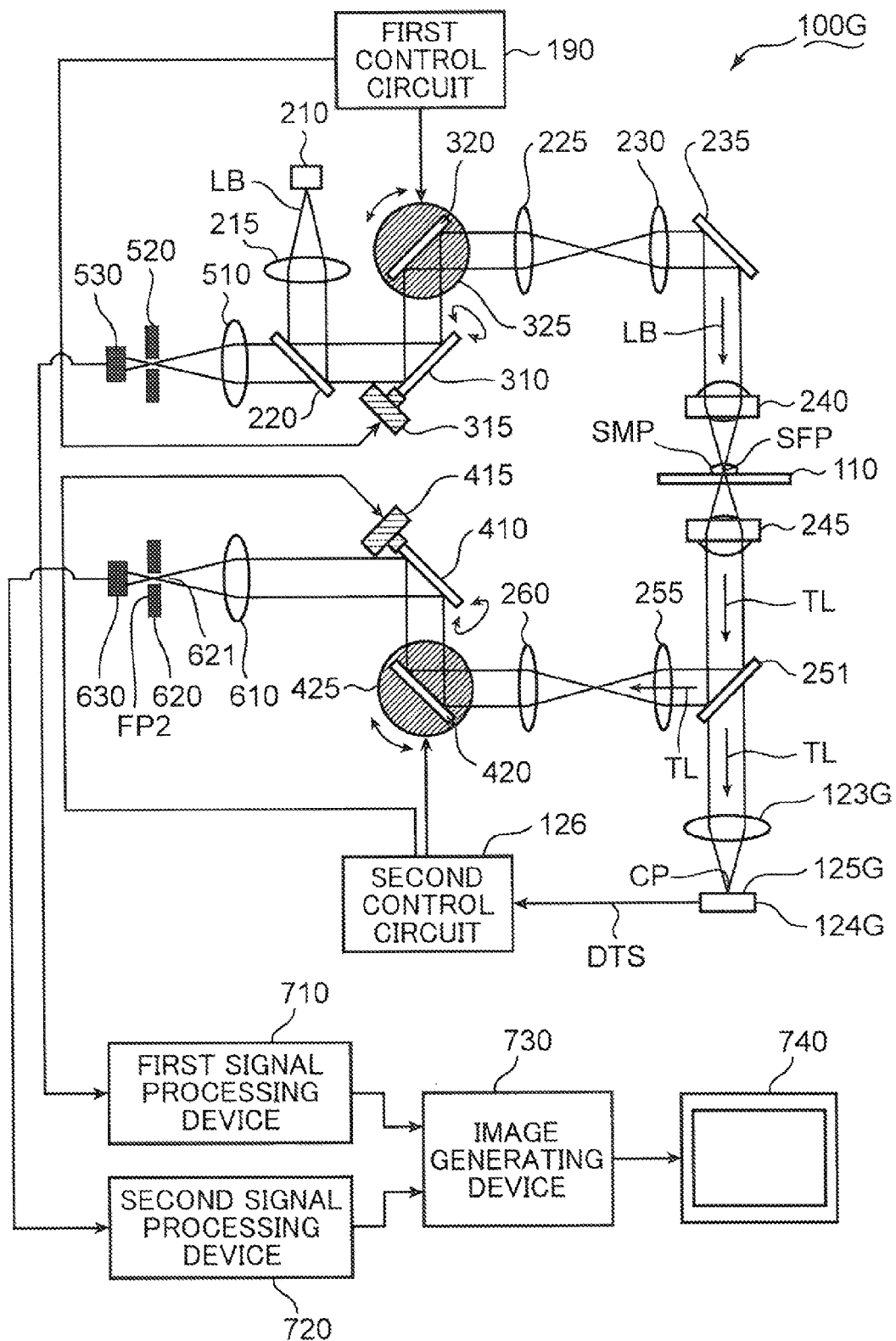
FIG. 12 is a schematic view of a confocal microscope according to the eighth embodiment.

FIG. 12 is a schematic view of a confocal microscope (hereinafter, referred to as a microscope 100G) according to the eighth embodiment. The microscope 100G is described with reference to FIGS. 1 and 12. The common reference numerals and signs among the second, seventh and eighth embodiments are applied to elements having the same functions as the second or seventh embodiment. Accordingly, the description in the second or seventh embodiment is applicable to these elements.

Like the second embodiment, the microscope 100G includes the laser source 210, the collimator lens 215, the beam splitter 220, the relay lenses 225, 230, the reflection mirror 235, the object lens 240, the collimator lens 245 and the relay lenses 255, 260. The microscope 100G further includes a mirror 251. The mirror 251 reflects a part of transmission light TL toward the relay lens 255, and allows passage of the other part of the transmission light TL. The laser source 210, the collimator lenses 215, 245, the beam splitter 220, the relay lenses 225, 230, 255, 260, the object lens 240, the reflection mirror 235 and the mirror 251 are designed as the light generator 200 described with reference to FIG. 1.

Like the second embodiment, the microscope 100G further includes the first and second deflection mirrors 310, 320 and the first and second driving motors 315, 325. The first and second deflection mirrors 310, 320 and the first and second driving motors 315, 325 are designed as the scanner 300 described with reference to FIG. 1.

Like the second embodiment, the microscope 100G further includes the slide glass 110. An observer may place the sample SMP on the slide glass 110.

Like the second embodiment, the microscope 100G further includes the first detection lens 510, the first pinhole member 520 and the first light detector 530. The first detection lens 510, the first pinhole member 520 and the first light detector 530 are designed as the first signal generator 500 described with reference to FIG. 1.

Like the second embodiment, the microscope 100G further includes the third and fourth deflection mirrors 410, 420 and the third and fourth driving motors 415, 425. The third and fourth deflection mirrors 410, 420 and the third and fourth driving motors 415, 425 are designed as the adjuster 400 described with reference to FIG. 1.

Like the second embodiment, the microscope 100G further includes the second detection lens 610, the second pinhole member 620 and the second light detector 630. The second detection lens 610, the second pinhole member 620 and the second light detector 630 are designed as the second signal generator 600 described with reference to FIG. 1.

Like the second embodiment, the microscope 100G further includes the first signal processing device 710, the second signal processing device 720, the image generating device 730 and the display device 740. The first signal processing device 710, the second signal processing device 720, the image generating device 730 and the display device 740 are designed as the image generator 700 described with reference to FIG. 1.

Like the seventh embodiment, the microscope 100G includes the first and second control circuits 190, 126. The microscope 100G further includes a condensing lens 123G and a light detector 124G. The light detector 124G includes a photo reception surface 125G facing the condensing lens 123G. The condensing leas 123G condenses the transmission light TL passing through the mirror 251 to form a condensing point CP on the photo reception surface 125G.

While the first and second driving motors 315, 325 are operated under control of the first control circuit 190, there is a change in inclination of the optical path of the transmission light TL formed between the mirror 251 and the photo reception surface 125G. The condensing point CP on the photo reception surface 125G changes in position in response to the inclination of the optical path of the transmission light TL formed between the mirror 251 and the photo reception surface 125G. The light detector 124G generates is detection signal DTS in correspondence to the position of the condensing point CP. Accordingly, the detection signal DTS may contain information about the inclination of the optical path of the transmission light TL formed between the mirror 251 and the photo reception surface 125G. The detection signal DTS is output from the light detector 124G to the second control circuit 126. The second control circuit 126 controls the third and fourth driving motors 415, 425 in response to the detection signal DTS.

An operator doing initial adjustment to the microscope 100G appropriately adjusts a relationship between a control signal output from the first control circuit 190 and an inclination angle of the first deflection mirror 310, and a relationship between the control signal output from the first control circuit 190 and an inclination angle of the second deflection mirror 320. However, such relationships may be changed during usage of the microscope 100G for a long period (e.g. mechanical vibration or misalignment of rotation shafts of the first and second deflection mirrors 310, 320). The change in mechanical or optical settings of the first and second deflection mirrors 310, 320 is reflected to the inclination of the optical path of the transmission light TL formed between the mirror 251 and the photo reception surface 125G. Since the second control circuit 126 uses the detection signal DTS representing the inclination of the optical path of the transmission light TL to control the third and fourth driving motors 415, 425, the second focal point FP2 is appropriately kept in the second pinhole 621.

Ninth Embodiment

When a sample moves along the optical paths of the reflection light and the transmission light, a three-dimensional image of the sample may be obtained. However, the movement of the sample along the optical paths of the reflection light and the transmission light changes spherical aberration. The change in spherical aberration causes a change in site of the sample focal point. A confocal microscope having a function for correcting spherical aberration is described in the ninth embodiment.

Figure 13:
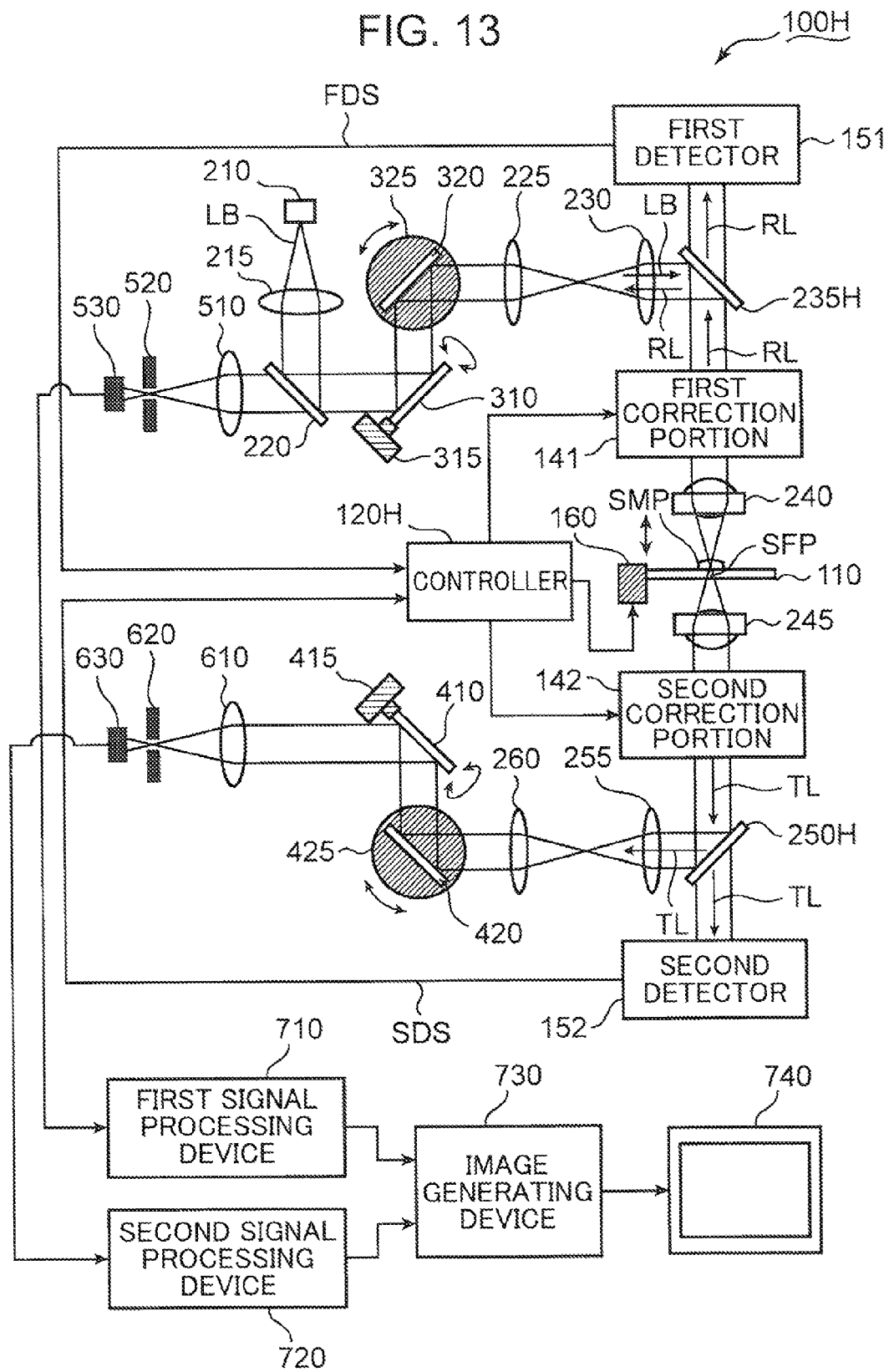
FIG. 13 is a schematic view of a confocal microscope according to the ninth embodiment.

FIG. 13 is a schematic view of a confocal microscope (hereinafter, referred to as a microscope 100H) according to the ninth embodiment. The microscope 100H is described with reference to FIGS. 1 and 13. The common, reference numerals and signs between the second and ninth embodiments are applied to elements having the same functions as the second embodiment. Accordingly, the description in the second embodiment is applicable to these elements.

Like the second embodiment, the microscope 100H includes the laser source 210, the collimator lens 215, the beam splitter 220, the relay lenses 225, 230, the object lens 240, the collimator lens 245, and the relay lenses 255, 260. The microscope 100H further includes mirrors 235H, 250H. The mirror 235H reflects a laser beam LB to the object lens 240. The mirror 235H reflects a part of reflection light RL toward the relay lens 230, and allows passage of the other part of the reflection light RL. The mirror 250H reflects a part of transmission light TL toward the relay lens 255, and allows passage of the other part of the transmission light TL. The laser source 210, the collimator lenses 215, 245, the beam splitter 220, the relay lenses 225, 230, 255, 260, the mirrors 235H, 250H and the object lens 240 are designed as the light generator 200 described with reference to FIG. 1.

Like the second embodiment, the microscope 100H further includes the first and second deflection mirrors 310, 320 and the first and second driving motors 315, 325. The first and second deflection mirrors 310, 320 and the first and second driving motors 315, 325 are designed as the scanner 300 described with reference to FIG. 1.

Like the second embodiment, the microscope 100H further includes the slide glass 110. An observer may place the sample SMP on the slide glass 110. In the present embodiment, the stage is exemplified by the slide glass 110. The stage may include a sample stage (not shown) on which the slide glass 110 is placed, in addition to the slide glass 110.

Like the second embodiment, the microscope 100H further includes the first detection lens 510, the first pinhole member 520 and the first light detector 530. The first detection lens 510, the first pinhole member 520 and the first light detector 530 are designed as the first signal generator 500 described with reference to FIG. 1.

Like the second embodiment, the microscope 100H further includes the third and fourth deflection mirrors 410, 420 and the third and fourth driving motors 415, 425. The third and fourth deflection mirrors 410, 420 and the third and fourth driving motors 415, 425 are designed as the adjuster 400 described with reference to FIG. 1.

Like the second embodiment, the microscope 100H further includes the second detection lens 610, the second pinhole member 620 and the second light detector 630. The second detection lens 610, the second pinhole member 620 and the second light detector 630 are designed as the second signal generator 600 described with reference to FIG. 1.

Like the second embodiment, the microscope 100H further includes the first and second signal processing devices 710, 720, the image generating device 730 and the display device 740. The first and second signal processing devices 710, 720, the image generating device 730 and the display device 740 are designed as the image generator 700 described with reference to FIG. 1.

The microscope 100H further includes a controller 120H, a first correction portion 141, a second correction portion 142, a first detector 151, a second detector 152 and a displacement mechanism 160. The displacement mechanism 160 displaces the slide glass 110 along an optical axis defined between the object lens 240 and the collimator lens 245 under control of the controller 120H. The first detector 151 receives the reflection light RL passing through the mirror 235H, and detects wavefront aberration of the reflection light RL. The first detector 151 then generates a first detection signal FDS in correspondence to the wavefront aberration. The second detector 152 receives the transmission light TL passing through the mirror 250H, and detects wavefront aberration of the transmission light TL. The second detector 152 then generates a second detection signal SDS in correspondence to the wavefront aberration. The controller 120H controls the first correction portion 141 in response to the tint detection signal FDS. The controller 120H controls the second correction portion 142 in response to the second detection signal SDS. Like the aforementioned various embodiments, the controller 120H may control the first driving motor 315 to the fourth driving motor 425. In the present embodiment, the first aberration detector is exemplified by the first detector 151. The second aberration detector is exemplified by the second detector 152. The first aberration signal is exemplified by the first detection signal FDS. The second aberration signal is exemplified by the second detection signal SDS.

The sample SMP is different in refractive index from the air. An optical distance from incidence of convergent light generated by the object lens 240 on the sample SMP to formation of the sample focal point SFP depends on a position of the slide glass 110. The change in the optical distance caused by the positional change of the slide glass 110 results in a change in spherical aberration of the convergent light. The change in the spherical aberration changes a size of the sample focal point SFP. The first correction portion 141 situated between the second deflection mirror 320 and the object lens 240 keeps the size of the sample focal point SFP under control of the controller 120H.

The positional change of the slide glass 110 also changes spherical aberration of the transmission light TL. The second correction portion 142 corrects the spherical aberration of the transmission light TL passing through the collimator lens 245 under control of the controller 120H. Therefore, the optical characteristics of the transmission light TL after passing through the second correction portion 142 are stabilized.

Shack-Hartmann wavefront sensors may be used as the first and second detectors 151, 152. Alternatively, techniques for detecting a phase wavefront by using an interferometer may be applied to the first and second detectors 151, 152. Further alternatively, techniques for detecting a difference in focus position between an outer edge and a center of signal light (reflection light RL and transmission light TL) may be applied to the first and second detectors 151, 152.

The first and second detectors 151, 152 may be omitted. In this case, the controller 120H may use a signal used for the positional control of the displacement mechanism 160 to identify a position of the slide glass 110. The controller 120H may control the first and second correction portions 141, 142 in synchronization with the positional adjustment of the slide glass 110.

The first and second correction portions 141, 142 may be a liquid crystal device including liquid crystal elements. The liquid crystal device may electrically cause a local change in refractive index to adjust spherical aberration. Alternatively, the first and second correction portions 141, 142 may be a lens device having a plurality of lenses. At least one of the lenses is a movable lens. The lens device ma electrically displace the movable lens along the optical path, along which the reflection light RL or the transmission light TL propagates, to adjust the spherical aberration.

Tenth Embodiment

The confocal microscope described in the context of the ninth embodiment uses a liquid crystal device or a lens device to correct the spherical aberration. The liquid crystal device and the lens device are not necessarily required for the correction of the spherical aberration. Techniques for correcting spherical aberration without a liquid crystal device and a lens device are described in the tenth embodiment.

Figure 14:
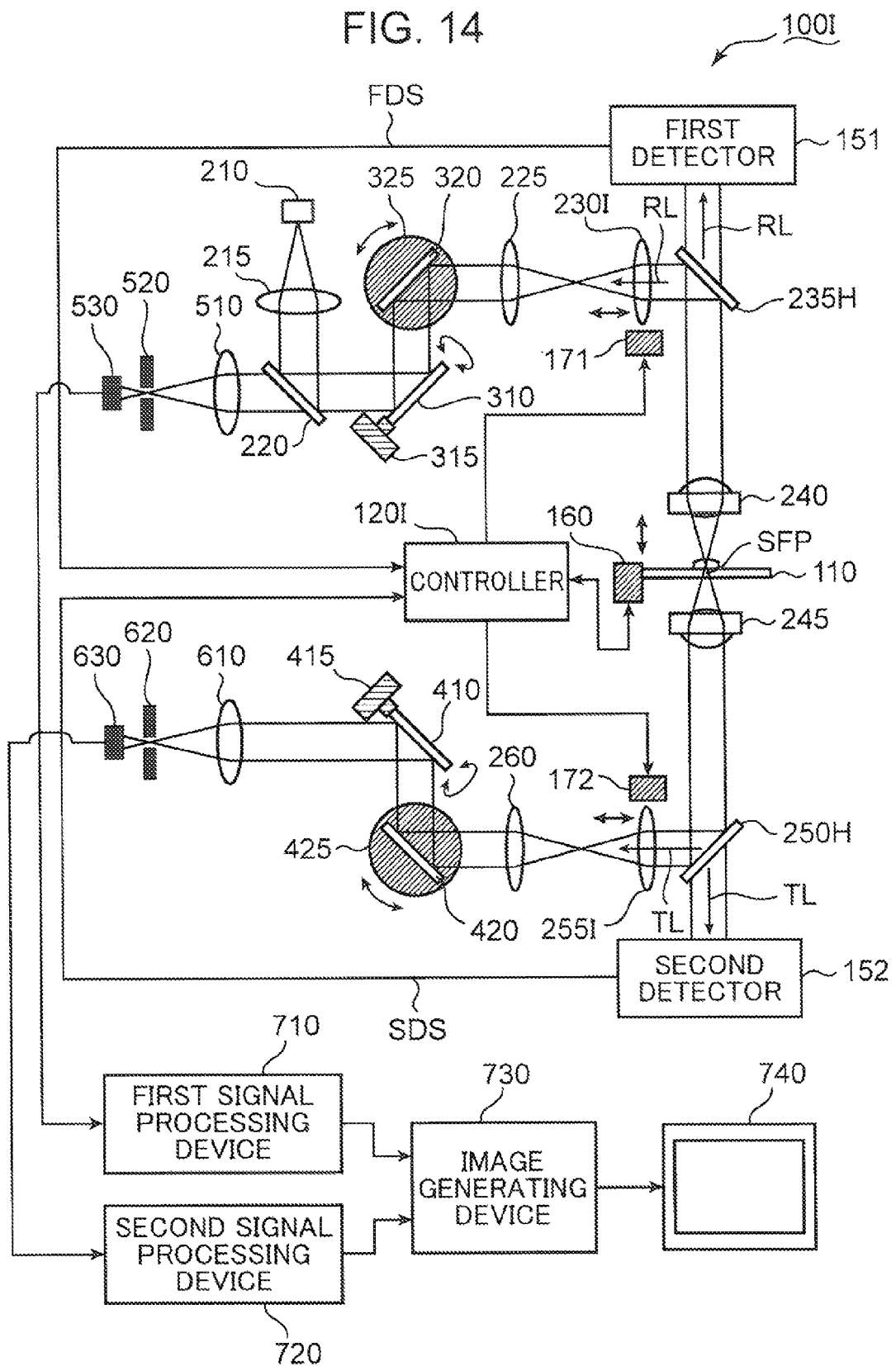
FIG. 14 is a schematic view of a confocal microscope according to the tenth embodiment.

FIG. 14 is a schematic view of a confocal microscope (hereinafter, referred to as a microscope 100I) according to the tenth embodiment. The microscope 100I is described with reference to FIGS. 1, 13 and 14. The common reference numerals and signs between the ninth and tenth embodiments are applied to elements having the same functions as the ninth embodiment. Accordingly, the description in the ninth embodiment is applicable to these elements.

Like the ninth embodiment, the microscope 100I includes the laser source 210, the collimator lens 215, the beam splitter 220, the relay lens 225, the mirrors 235H, 250H, the object lens 240, the collimator lens 245 and the relay lens 260. The microscope 100I further includes relay lenses 230I, 255I. The relay lens 230I may be displaced along an optical axis defined between the relay lens 225 and the mirror 235H. The relay lens 255I may be displaced along an optical axis defined between the mirror 250H and the relay lens 260. The laser source 210, the collimator lenses 215, 245, the beam splitter 220, the relay lenses 225, 230I, 255I, 260, the mirrors 235H, 250H and the object lens 240 are designed as the light generator 200 described with reference to FIG. 1.

Like the ninth embodiment, the microscope 100I further includes the first and second deflection mirrors 310, 320 and the first and second driving motors 315, 325. The first and second deflection mirrors 310, 320 and the first and second driving motors 315, 325 are designed as the scanner 300 described with reference to FIG. 1.

Like the ninth embodiment, the microscope 100I further includes the first detection lens 510, the first pinhole member 520 and the first light detector 530. The first detection lens 510, the first pinhole member 520 and the first light detector 530 are designed as the first signal generator 500 described with reference to FIG. 1.

Like the ninth embodiment, the microscope 100I further includes the third and fourth deflection mirrors 410, 420 and the third and fourth driving motors 415, 425. The third and fourth deflection mirrors 410, 420 and the third and fourth driving motors 415, 425 are designed as the adjuster 400 described with reference to FIG. 1.

Like the ninth embodiment, the microscope 100I further includes the second detection lens 610, the second pinhole member 620 and the second light detector 630. The second detection lens 610, the second pinhole member 620 and the second light detector 630 are designed as the second signal generator 600 described with reference to FIG. 1.

Like the ninth embodiment, the microscope 100I further includes the first and second signal processing devices 710, 720, the image generating device 730 and the display device 740. The first and second signal processing devices 710, 720, the image generating device 730 and the display device 740 are designed as the image generator 700 described with reference to FIG. 1.

Like the ninth embodiment, the microscope 100I includes the slide glass 110, the first and second detectors 151, 152 and the displacement mechanism 160. The microscope 100I further includes a controller 120I, a first driving device 171 and a second driving device 172. The displacement mechanism 160 displaces the slide glass 110 along an optical axis defined between the object lens 240 and the collimator lens 245 under control of the controller 120I. The first detector 151 receives the reflection light RL passing through the mirror 235H, and detects wavefront aberration of the reflection light RL. The first detector 151 then generates a first detection signal FDS in correspondence to the wavefront aberration. The second detector 152 receives the transmission light TL passing through the mirror 250H, and detects wavefront aberration of the transmission light TL. The second detector 152 then generates a second detection signal SDS in correspondence to the wavefront aberration.

The controller 120I controls the first driving device 171 in response to the first detection signal FDS. The first driving device 171 displaces the relay lens 230I along an optical axis defined between the relay lens 225 and the mirror 235H under control of the controller 120I. Consequently, the spherical aberration for the reflection light RL is appropriately adjusted.

The controller 120I controls the second driving device 172 in response to the second detection signal SDS. The second driving device 172 displaces the relay lens 255I along an optical axis defined between the relay lens 260 and the mirror 250H under control of the controller 120I. Consequently, the spherical aberration for the transmission light TL is appropriately adjusted. Like the aforementioned various embodiments, the controller 120I may control the first driving motor 315 to the fourth driving motor 495.

The principles of the present embodiment may be applied to the microscope 100H according to the ninth embodiment. For example, the spherical aberration may be roughly adjusted by the displacement of the relay lens on the basis of the principles of the present embodiment. The spherical aberration may be then finely adjusted by the liquid crystal device and the lens device according to the principles of the ninth embodiment.

The principles of the ninth and tenth embodiments stabilize a size of the sample focal the point SFP. Accordingly, the reflection image, the transmission image and the synthetic image are very accurately generated.

Eleventh Embodiment

A confocal microscope uses an object lens to generate convergent light and form a sample focal point in a sample. The confocal microscope two-dimensionally displaces the sample focal point to optically scan the sample. An inclination of an optical path of the convergent light is changed in response to a position of the sample focal point.

If there is a small numerical aperture NA of the object lens (e.g. NA<0.1), a change in the inclination of the optical path of the convergent light does not become so large during optical scanning over the sample.

If there is a large numerical aperture NA of the object lens (e.g. NA>0.6), the sample focal point may be as small as the diffraction limit. The small sample focal point results in high resolution of the reflection image, the transmission image and the synthetic image. However, when a small sample focal point is formed, the change in inclination of the optical path of the convergent light during the optical scanning over the sample may result in an unignorable change in coma aberration. In short, a size of the sample focal point becomes unstable during the optical scanning over the sample, so that there is a change in resolution of the reflection image, the transmission image and the synthetic image. The techniques for detecting the inclination described in the context of the seventh embodiment may be applied to adjust the coma aberration. Techniques for correcting coma aberration are described in the eleventh embodiment.

Figure 15:
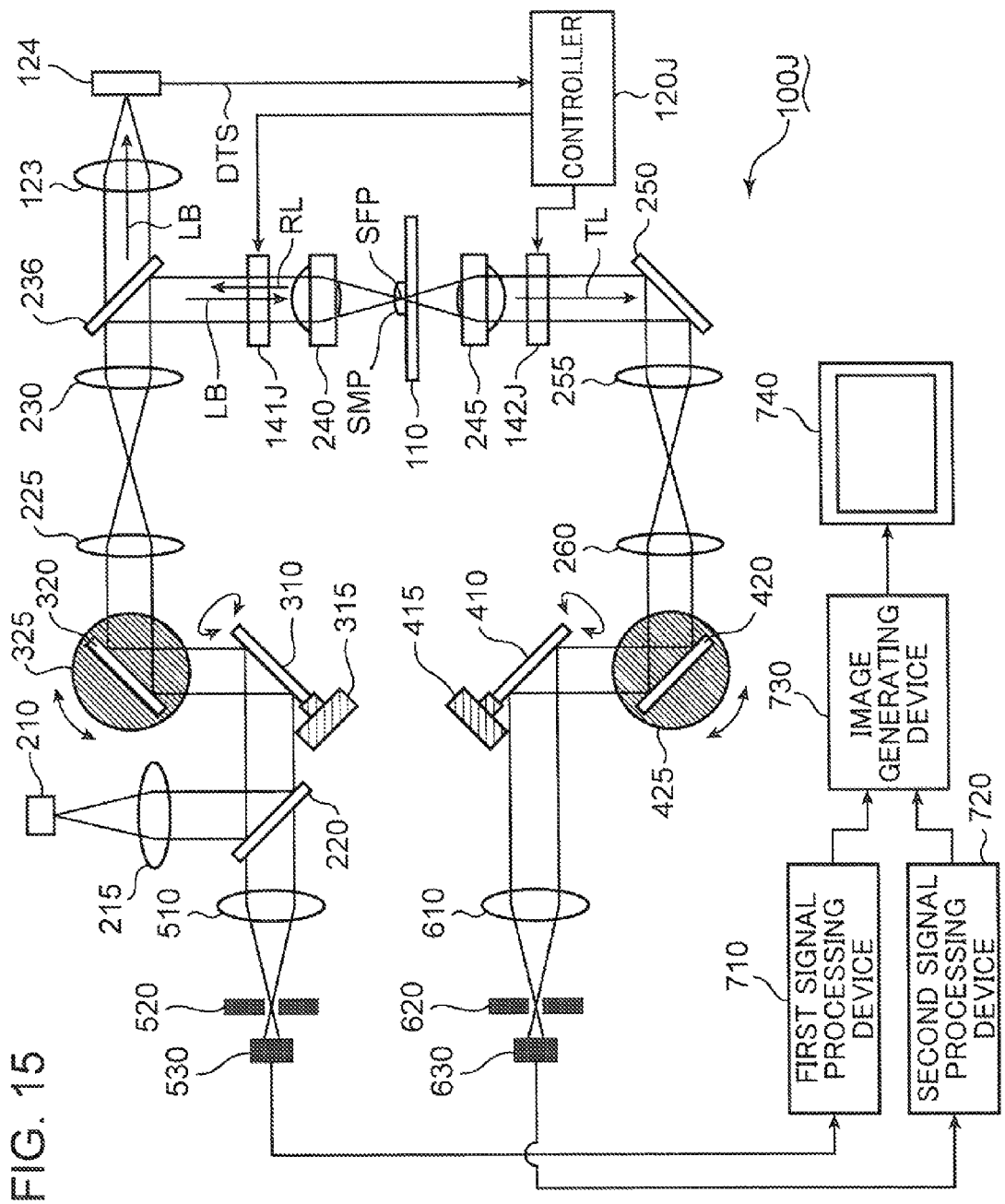
FIG. 15 is a schematic view of a confocal microscope according to the eleventh embodiment.

FIG. 15 is a schematic view of a confocal microscope (hereinafter, referred to as a microscope 100J) according to the eleventh embodiment. The microscope 100J is described with reference to FIGS. 10 and 15. The common reference numerals and signs between the seventh and eleventh embodiments are applied to elements having the same functions as the seventh embodiment. Accordingly, the description in the seventh embodiment is applicable to these elements.

Like the seventh embodiment, the microscope 100J includes the laser source 210, the collimator lens 215, the beam splitter 220, the relay lenses 225, 230, the mirror 236, the object lens 240, the collimator lens 245, the reflection mirror 250 and the relay lenses 255, 260. The laser source 210, the collimator lenses 215, 245, the beam splitter 220, the relay lenses 225, 230, 255, 260, the mirror 236, the object lens 240 and the reflection mirror 250 are designed as the light generator 200F described with reference to FIG. 10.

Like the seventh embodiment, the microscope 100J further includes the first and second deflection mirrors 310, 320 and the first and second driving motors 315, 325. The first and second deflection mirrors 310, 320 and the first and second driving motors 315, 325 are designed as the scanner 300 described with reference to FIG. 10.

Like the seventh embodiment, the microscope 100J further includes the slide glass 110. An observer may place the sample SMP on the slide glass 110.

Like the seventh embodiment, the microscope 100J further includes the first detection lens 510, the first pinhole member 520 and the first light detector 530. The first detection lens 510, the first pinhole member 520 and the first light detector 530 are designed as the first signal generator 500 described with reference to FIG. 10.

Like the seventh embodiment, the microscope 100J further includes the third and fourth deflection mirrors 410, 420 and the third and fourth driving motors 415, 425. The third and fourth deflection mirrors 410, 420 and the third and fourth driving motors 415, 425 are designed as the adjuster 400 described with reference to FIG. 10.

Like the seventh embodiment, the microscope 100J further includes the second detection lens 610, the second pinhole member 620 and the second light detector 630. The second detection lens 610, the second pinhole member 620 and the second light detector 630 are designed as the second signal generator 600 described with reference to FIG. 10.

Like the seventh embodiment, the microscope 100J further includes the first and second signal processing devices 710, 720, the image generating device 730 and the display device 740. The first and second signal processing devices 710, 720, the image generating device 730 and the display device 740 are designed as the image generator 700E described with reference to FIG. 10.

Like the seventh embodiment, the microscope 100J includes the condensing lens 123 and the light detector 124. The microscope 100J further includes a controller 120J, a first correction portion 141J and a second correction portion 142J. The detection signal DTS generated by the light detector 124 is output to the controller 120J. The controller 120J controls the first and second correction portions 141J, 142J in response to the detection signal DTS. As described in the context of the seventh embodiment, since the detection signal DTS contains information about the inclination of the optical path of the laser beam LB, the first and second correction portions 141J, 142J may correct coma aberration caused by the inclination of the optical path of the laser beam LB during movement of the sample focal point SFP. Therefore, a size of the sample focal point SFP is kept substantially consistent. The first correction portion 141J corrects the coma aberration of the laser beam LB between the second deflection mirror 320 and the object lens 240. The second correction portion 142J corrects the coma aberration of the transmission light TL. Consequently, the microscope 100J may very accurately generate the synthetic image, the reflection image and/or the transmission image. Like the aforementioned various embodiments, the controller 120J may control the first driving motor 315 to the fourth driving motor 425. In the present embodiment, the third correction portion is exemplified by the first correction portion 141J. The fourth correction portion is exemplified by the second correction portion 142J.

The first and second correction portions 141J, 142J may be a liquid crystal device including liquid crystal elements. The liquid crystal device may electrically cause a local change in refractive index to adjust spherical aberration. Alternatively, the first and second correction portions 141J, 142J may be lens devices having a plurality of lenses. At least one of the lenses is a movable lens. The lens device may electrically displace the movable lens along the optical path, on which the reflection light RL or the transmission light TL propagates, to adjust the spherical aberration.

The coma aberration may be corrected by using techniques other than the detection of the inclination of the optical path of the laser beam LB. The confocal microscope may include a detection sensor configured to detect coma aberration components. The detection sensor may generate a detection signal representing the coma aberration components. The confocal microscope may adjust the coma aberration in response to the detection signal. Alternatively, the confocal microscope may identify the inclination of the optical path from a driving signal for driving a deflection mirror.

Twelfth Embodiment

A confocal microscope may use a plurality of light fluxes different in wavelengths to generate a synthetic image. When a sample has parts different in absorption wavelength or transmission wavelength, a synthetic image may use the difference in absorption and transmission wavelengths to accurately show characteristics of the sample. For example, the confocal microscope may generate a synthetic image of a sample every absorption wavelength. A confocal microscope which uses a plurality of light fluxes different in wavelengths to generate a synthetic image is described in the twelfth embodiment.

Figure 16:
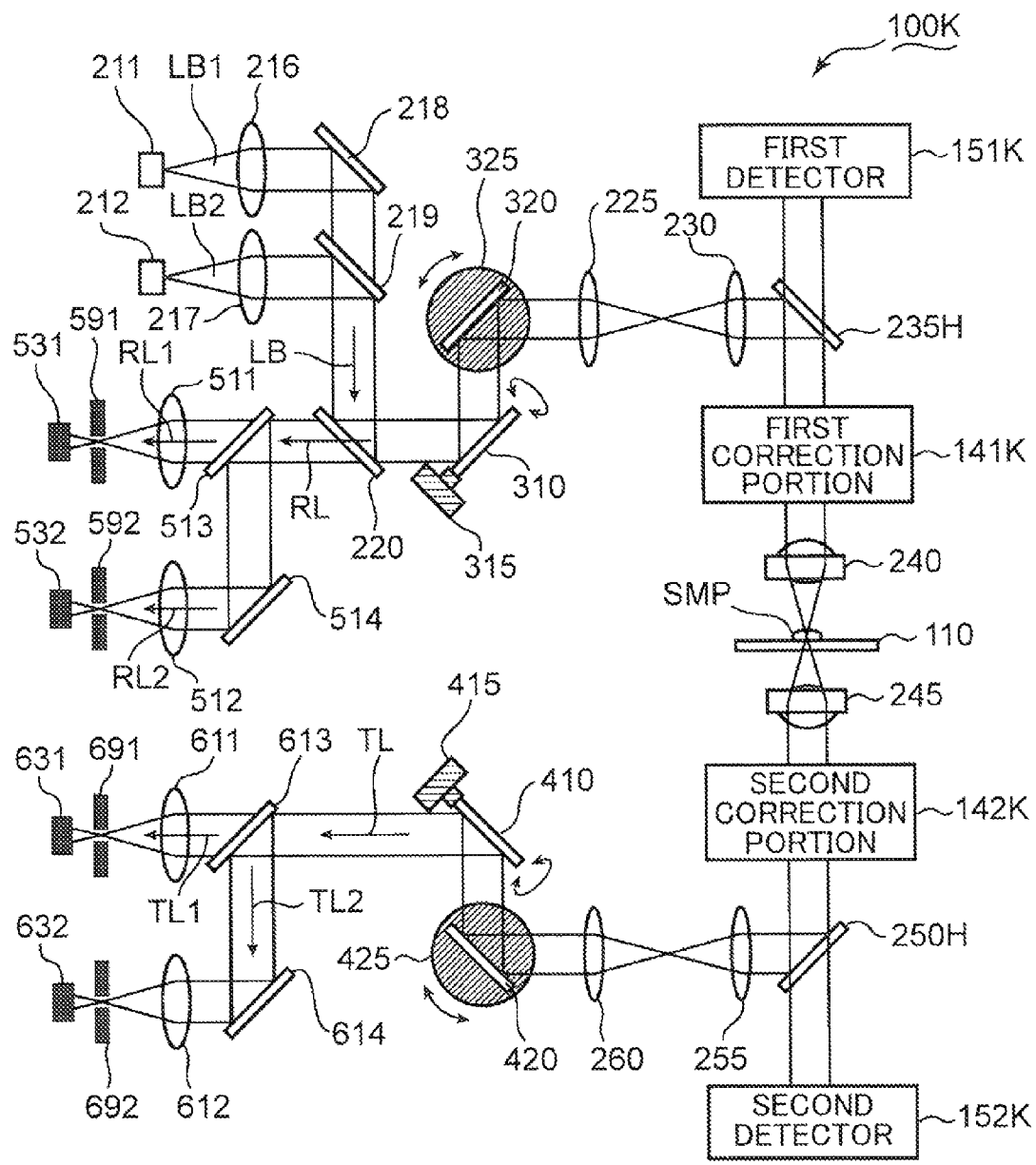
FIG. 16 is a schematic view of an optical system of a confocal microscope according to the twelfth embodiment.

FIG. 16 is a schematic view of an optical system of a confocal microscope (hereinafter, referred to as a microscope 100K) according to the twelfth embodiment. The microscope 100K is described with reference to FIGS. 1, 13 and 16. The principles of the aforementioned various embodiments may be applied to a driving system and image generation of the microscope 100K. The common reference numerals and signs between the eleventh, and twelfth embodiments are applied to elements having the same functions as the eleventh embodiment. Accordingly, the description in the eleventh embodiment is applicable to these elements.

Like the ninth embodiment, the microscope 100K includes the beam splitter 220, the relay lenses 225, 230, the mirrors 235H, 250H, the object lens 240, the collimator lens 245 and the relay lenses 255, 260. The microscope 100K further includes a first laser source 211, a second laser source 212, a first collimator lens 216, a second collimator lens 217, a reflection mirror 218 and a dichroic mirror 219.

The first laser source 211 emits a laser beam LB1 to the first collimator lens 216. The first collimator lens 216 forms the laser beam LB1 into collimated light. The laser beam LB1 passing through the first collimator lens 216 is reflected toward the dichroic mirror 219. The second laser source 212 emits the laser beam LB2 to the second collimator lens 217. The second collimator lens 217 forms the laser beam LB2 into collimated light. The laser beam LB2 passing through the second collimator lens 217 reaches the dichroic mirror 219. The dichroic mirror 219 combines the laser beams LB1, LB2 to generate a laser beam LB. The laser beam LB2 is different in wavelength from the laser beam LB1. The first and second laser sources 211, 212, the first and second collimator lenses 216, 217, the reflection mirror 218, the dichroic mirror 219, the beam splitter 220, the relay lenses 225, 230, 255, 260, the mirrors 235H, 250H, the object lens 240 and the collimator lens 245 are designed as the light generator 200 described with reference to FIG. 1. In the present embodiment, the first laser beam is exemplified by the laser beam LB1. The second laser beam is exemplified by the laser beam LB2.

Like the ninth embodiment, the microscope 100K further includes the first and second deflection mirrors 310, 320 and the first and second driving motors 315, 325. The first and second deflection mirrors 310, 320 and the first and second driving motors 315, 325 are designed as the scanner 300 described with reference to FIG. 1.

Like the ninth embodiment, the microscope 100K further includes the slide glass 110. An observer may place the sample SMP on the slide glass 110.

Like the ninth embodiment, the microscope 100K further includes the third and fourth deflection mirrors 410, 420 and the third and fourth driving motors 415, 425. The third and fourth deflection mirrors 410, 420 and the third and fourth driving motors 415, 425 are designed as the adjuster 400 described with reference to FIG. 1.

The microscope 100K further includes detection lenses 511, 512, pinhole members 591, 592, light, detectors 531, 532, a dichroic mirror 513 and a reflection mirror 514. The detection lenses 511, 512, the pinhole members 591, 592 and the light detectors 531, 532 are designed as the first signal generator 500 described with reference to FIG. 1.

Like the aforementioned various embodiments, the laser beam LB returns to the beam splitter 220 as the reflection light RL. The reflection light RL is incident on the dichroic mirror 513 situated between the beam splitter 220 and the detection lens 511. The dichroic mirror 513 splits the reflection light RL into reflection light RL1 deriving from the laser beam LB1 and reflection light RL2 deriving from the laser beam LB2.

The reflection light RL1 passes through the dichroic mirror 513, and is incident on the detection lens 511. The dichroic mirror 513 reflects the reflection light RL2 toward the reflection mirror 514. The reflection mirror 514 reflects the reflection light RL2 toward the detection lens 512.

The detection lens 511 condenses the reflection light RL1 into the pinhole of the pinhole member 591. The reflection light RL1 then passes through the pinhole member 591, and is incident on the light detector 531. The light detector 531 generates a signal in correspondence to intensity of the reflection light RL1.

The detection lens 512 condenses the reflection light RL2 into the pinhole of the pinhole member 592. The reflection light RL2 then passes through the pinhole member 592, and is incident on the light detector 532. The light detector 532 generates a signal in correspondence to intensity of the reflection light RL2.

The microscope 100K further includes detection lenses 611, 612, pinhole members 691, 692, light detectors 631, 632, a dichroic mirror 613 and a reflection mirror 614. The detection lenses 611, 612, the pinhole members 691, 692 and the light detectors 631, 632 are designed as the second signal generator 600 described with reference to FIG. 1.

Like the aforementioned various embodiments, the laser beam LB is emitted from the third deflection mirror 410 as the transmission light TL. The transmission light TL is then incident on the dichroic mirror 613. The dichroic mirror 613 splits the transmission light TL into transmission light TL1 deriving from the laser beam LB1 and transmission light TL2 deriving from the laser beam LB2.

The transmission light TL1 passes through the dichroic mirror 613, and is incident on the detection lens 611. The dichroic mirror 613 reflects the transmission light TL2 toward the reflection mirror 614. The reflection mirror 614 reflects the transmission light TL2 toward the detection lens 612.

The detection lens 611 condenses the transmission light TL1 into the pinhole of the pinhole member 691. The transmission light TL1 then passes through the pinhole member 691, and is incident on the light detector 631. The light detector 631 generates a signal in correspondence to intensity of the transmission light TL1.

The detection lens 612 condenses the transmission light TL2 into the pinhole of the pinhole member 692. The transmission light TL2 then passes through the pinhole member 692, and is incident on the light detector 632. The light detector 632 generates a signal in correspondence to intensity of the transmission light TL2.

The microscope 100K further includes a first correction portion 141K, a second correction portion 142K, a first detector 151K and a second detector 152K. When there is a large difference in wavelength between the laser beams LB1, LB2, chromatic aberration may occur. The first and second detectors 151K, 152K detect the chromatic aberration. The first and second detectors 151K, 152K generate detection signals containing information about the chromatic aberration. The first and second correction portions 141K, 142K may correct the chromatic aberration in response to the detection signals from the first and second detectors 151K, 152K.

When the sample SMP has different characteristics in response to absorption wavelengths or transmission wavelengths of the laser beam LB, the microscope 100K may give an observer various kinds of information about the sample SMP.

The confocal microscope may use more than two kinds of wavelengths to generate a synthetic image. When the confocal microscope uses a red laser beam, a green laser beam and a blue laser beam, a color image of the sample SMP is generated.

The light reception wavelengths of the light detectors 531, 631 may not match with the wavelength of the laser beam LB1. The light reception wavelengths of the light detectors 532, 632 may not match with the wavelength of the laser beam LB2. For example, these light reception wavelengths of the light detectors 531, 532, 631, 632 may be matched with a wavelength of light emitted from the sample SMP (i.e. light emitted by fluorescent substances or multiphoton excitation).

The principles of the aforementioned various embodiments may be appropriately combined so as to be suitable for an application of the confocal microscope.

The techniques about the exemplificative observing device described in the context of the aforementioned various embodiments mainly have the following features.

A confocal microscope according to one aspect of the aforementioned embodiment includes a light generator configured to simultaneously generate reflection light, which is reflected from a sample, and transmission light, which passes through the sample, a scanner configured to optically scan the sample and define a direction of a first optical path, along which the reflection light propagates, an adjuster configured to angularly adjust a direction of a second optical path, along which the transmission light propagates, a first signal generator configured to generate a first signal based on the reflection light, a second signal generator configured to generate a second signal based on the transmission light, and an image generator configured to generate a synthetic image in which a reflection image represented by the reflection light and a transmission image represented by the transmission light are synthesized in response to the first and second signals.

According to the aforementioned configuration, since the synthetic image is formed from the reflection image and the transmission image, which are simultaneously generated, an observer observing a sample through the confocal microscope may quickly obtain information about the sample. Since the reflection light propagates along the first optical path and the transmission light propagates along the second optical path, the first signal is less likely to be affected by the transmission light, and the second signal is less likely to be affected by the reflection light. Therefore, the synthetic image generated in response to the first and second signals may include very accurate information about the sample. In addition, since the synthetic image includes the information contained in the reflection image and the information contained in the transmission image, the observer may obtain a lot of information about the sample.

In the aforementioned configuration, the confocal microscope may further include a controller configured to control the scanner and the adjuster. The light generator may include a light source portion, which emits emission light, and an object lens, which condenses the emission light toward the sample to form a sample focal point. The first signal generator may include a first optical condenser, which condenses the reflection light to form a first focal point, a first transmissive member, which has a first transmissive area around the first focal point to allow passage of the reflection light and a first blocking area around the first transmissive area to block the reflection light, and a first detector, which detects intensity of the reflection light passing through the first transmissive area to generate the first signal. The second signal generator may include a second optical condenser, which condenses the transmission light to form a second focal point, a second transmissive member, which has a second transmissive area to allow passage of the transmission light and a second blocking area around the second transmissive area to block the transmission light, and a second detector, which detects intensity of the transmission light passing through the second transmissive area to generate the second signal. The scanner may include a first reflective portion, which reflects the emission light and the reflection light on the first optical path, and a first driver, which drives the first reflective portion to displace the sample focal point in a main scanning direction and a sub-scanning direction which are defined on the sample. The adjuster may include a second reflective portion, which reflects the transmission light on the second optical path, and a second driver, which drives the second reflective portion. The controller may control the first and second drivers to keep the second focal point in the second transmissive area while the sample focal point is displaced on the sample.

According to the aforementioned configuration, since the first blocking area blocks the reflection light around the first transmissive area, the first signal is generated so that the first signal contains little noise information resulting from reflection light components around the first focal point. Since the second blocking area blocks the transmission light around the second transmissive area, the second signal is generated so that the second signal contains little noise information resulting from transmission light components around the second focal point. Therefore, the synthetic image may include very accurate information about the sample.

Since the controller controls the first and second drivers to keep the second focal point in the second transmissive area while the sample focal point is displaced on the sample, the synthetic image may be formed from the reflection light and the transmission light which are simultaneously generated. Therefore, an observer may quickly obtain information about the sample.

In the aforementioned configuration, the light generator may include a collimator lens situated on the second optical path. The object lens may generate first collimated light from the reflection light which is emitted from the sample focal point. The collimator lens may generate second collimated light from the transmission light which is emitted from the sample focal point. The first collimated light may reach the first signal generator from the object lens through the scanner. The second collimated light may reach the second signal generator from the collimator lens through the adjuster.

According to the aforementioned configuration, the first collimated light reaches the first signal generator from the object lens through the scanner. The first collimated light is condensed by the first optical condenser in the first signal generator. The second collimated light reaches the second signal generator through the adjuster from the collimator lens. The second collimated light is condensed by the second optical condenser in the second signal generator Since the first collimated light is different in propagation path from the second collimated light, the first signal is less likely to be affected by the transmission light. Since the second collimated light is different in propagation path from the first collimated light, the second signal is less likely to be affected by the reflection light. Therefore, the synthetic image generated in response to the first and second signals may include very accurate information about the sample.

In the aforementioned configuration, the controller may make a driving operation of the second driver collaborated with a driving operation of the first driver.

According to the aforementioned configuration, since the controller associates a driving operation of the second driver with a driving operation of the first driver, the second focal point is kept in the second transmissive area while the sample focal point is displaced on the sample. Consequently, the synthetic image may be formed from the reflection light and the transmission light which are simultaneously generated. Therefore, an observer may quickly obtain information about the sample.

In the aforementioned configuration, the first reflective portion may include a first reflector, which displaces the sample focal point in the main scanning direction, and a second reflector, which displaces the sample focal point in the sub-scanning direction. The first driver may include a first driving device, which drives the first reflector, and a second driving device, which drives the second reflector. The second reflective portion may include a third reflector, which operates in synchronization with the first reflector, and a fourth reflector, which operates in synchronization with the second reflector. The second driver may include a third driving device, which is controlled in association with the driving operation of the first driving device by the controller, and a fourth driving device, which is controlled in association with the driving operation of the second driving device by the controller.

According to the aforementioned configuration, since the first to fourth driving devices are provided for the first to fourth reflectors, respectively, there is easy optimization for adjustment operation to the first and second optical paths. Since the third driving device is controlled in association with the driving operation of the first driving device by the controller, an operator adjusting optical settings of the confocal microscope may easily adjust operations associated with the sample focal point moving in the main scanning direction. Since the fourth driving device is controlled in association with the driving operation of the second driving device by the controller, the operator may easily adjust operation associated with the sample focal point moving in the sub-scanning direction.

In the aforementioned configuration, the controller may control the third driving device to make displacement in the main scanning direction of the sample focal point less influential to a position of the second focal point. The controller may control the fourth driving device to make displacement in the sub-scanning direction of the sample focal point less influential to a position of the second local point.

According to the aforementioned configuration, since the controller controls the third driving device to make displacement in the main scanning direction of the sample focal point less influential to a position of the second focal point, the second focal point is kept in the second transmissive area even while the sample focal point is displaced in the main scanning direction. Since the controller controls the fourth driving device to make displacement in the sub-scanning direction of the sample focal point less influential to a position of the second focal point, the second focal point is kept in the second transmissive area even while the sample focal point is displaced in the main scanning direction. Consequently, the synthetic image may be formed from the reflection light and the transmission light which are simultaneously generated. Therefore, an observer may quickly obtain information about the sample.

In the aforementioned configuration, the confocal microscope may further include a stage on which the sample is placed, a displacement mechanism configured to displace the stage along an optical axis defined between the object lens and the collimator lens, a first correction portion configured to correct spherical aberration of the emission light between the scanner and the object lens, and a second correction portion configured to correct spherical aberration of the second collimated light. The controller may control the first and second correction portions in response to a position of the stage on the optical axis defined between the object lens and the collimator lens, and adjusts the spherical aberration of the emission light and the spherical aberration of the second collimated light.

According to the aforementioned configuration, the controller controls the first and second correction portions in response to a position of the stage to adjust spherical aberration of the emission light and the second collimated light, the synthetic image is generated from the reflection light and the transmission light which are emitted from the small sample focal point. Therefore, the synthetic image may contain very accurate information about the sample.

In the aforementioned configuration, the confocal microscope may further include a first correction portion configured to correct spherical aberration of the emission light between the scanner and the object lens, a second correction portion configured to correct spherical aberration of the second collimated light, a first aberration detector which detects spherical aberration of the first collimated light to generate a first aberration signal representing the spherical aberration of the first collimated light, and a second aberration detector which detects spherical aberration of the second collimated light to generate a second aberration signal representing the spherical aberration of the second collimated light. The controller may control the first and second correction portions in response to the first and second aberration signals, and adjust the spherical aberration of the emission light and the spherical aberration of the second collimated light.

According to the aforementioned configuration, since the controller controls the first and second correction portions in response to the first and second aberration signals to adjust spherical aberration of the emission light and the second collimated light, the synthetic image is generated from the reflection light and the transmission light which are emitted from the small sample focal point. Therefore, the synthetic image may contain very accurate information about the sample.

In the aforementioned configuration, each of the first and second correction portions may be a liquid crystal device including a liquid crystal element or a lens device having a plurality of lenses including a movable lens.

According to the aforementioned configuration, the spherical aberration is appropriately adjusted.

In the aforementioned configuration, the controller may include an inclination detector, which detects an inclination of an optical path of the emission light passing through the scanner and outputs a detection signal representing the inclination of the optical path of the emission light, and a synchronization controller, which performs synchronous control between the scanner and the adjuster in response to the detection signal.

According to the aforementioned configuration, since the synchronization controller performs synchronous control between the scanner and the adjuster in response to the detection signal, the adjuster may be appropriately collaborated with operation of the scanner.

In the aforementioned configuration, the controller may include an inclination detector, which detects an inclination of an optical path of the transmission light and outputs a detection signal representing the inclination of the optical path of the transmission light, and a synchronization controller, which performs synchronous control between the scanner and the adjuster in response to the detection signal.

According to the aforementioned configuration, since the synchronization controller performs synchronous control between the scanner and the adjuster in response to the detection signal, the adjuster may be appropriately collaborated with operation of the scanner.

In the aforementioned configuration, the confocal microscope may further include a third correction portion configured to correct coma aberration of the emission light between the scanner and the object lens, and a fourth correction portion configured to correct coma aberration of the second collimated light. The controller may include an inclination detector, which detects an inclination of an optical path of the emission light passing through the scanner and outputs a detection signal representing the inclination of the optical path of the emission light, and cannot the third and second correction portions in response to the detection signal.

According to the aforementioned configuration, since the controller controls the third and fourth correction portions in response to the detection signal, coma aberration of the emission light and the second collimated light is appropriately corrected. Consequently, the synthetic image is generated from the reflection light and the transmission light which are emitted from the small sample local point. Therefore, the synthetic image may include very accurate information about the sample.

In the aforementioned configuration, the light source portion includes a first laser source, which emits a first laser beam as the emission light, and a second laser source, which emits a second laser beam as the emission light different in wavelength from the first laser beam.

According to the aforementioned configuration, an observer may separately observe conditions of sample components different in absorption wavelength or transmission wavelength.

In the aforementioned configuration, the image generator may include a brightness adjuster which performs a brightness adjustment process to decrease a difference in brightness level between the reflection image and the transmission image.

According to the aforementioned configuration, since the brightness adjuster performs the brightness adjustment process to decrease a difference in brightness level between the reflection image and the transmission image, an observer may observe the synthetic image with excellent visibility.

In the aforementioned configuration, the brightness adjuster may include an amplifier which amplifies the first signal to generate an amplified signal. The image generator may include a synthesizer Which generates the synthetic image from the amplified signal and the second signal.

According to the aforementioned configuration, since the synthesizer generates the synthetic image from the amplified signal and the second signal, there is a decreased difference in brightness level between the reflection image and the transmission image. Therefore, an observer may observe the synthetic image with excellent visibility.

In the aforementioned configuration, the brightness adjuster may include an attenuator which attenuates the second signal to generate an attenuated signal. The image generator may include a synthesizer configured to generate the synthetic image from the attenuated signal and the first signal.

According to the aforementioned configuration, since the synthesizer generates the synthetic image from the attenuated signal and the first signal, there is a decreased difference in brightness level between the reflection image and the transmission image. Therefore, an observer may observe the synthetic image with excellent visibility.

In the aforementioned configuration, the brightness adjuster may include an amplifier, which amplifies the first signal to generate an amplified signal, and an attenuator which attenuates the second signal to generate an attenuated signal. The image generator may include a synthesizer configured to generate the synthetic image from the amplified signal and the attenuated signal.

According to the aforementioned configuration, since the synthesizer generates the synthetic image from the amplified signal and the attenuated signal, there is a decreased difference in brightness level between the reflection image and the transmission image. Therefore, an observer may observe the synthetic image with excellent visibility.

In the aforementioned configuration, the brightness adjuster may amplify the first signal at an amplification rate from 10 times to 100 times.

According to the aforementioned configuration, since the brightness adjuster amplifies the first signal at the amplification rate from 10 times to 100 times, there is a decreased difference in brightness level between the reflection image and the transmission image. Therefore, an observer may observe the synthetic image with excellent visibility.

In the aforementioned configuration, each of the scanner and the adjuster may include at least one selected from a group consisting of a galvanomirror, an acousto-optic deflector, an electro-optic element and a polygonal mirror.

According to the aforementioned configuration, since each of the scanner and the adjuster includes at least one selected from a group consisting of a galvanomirror, an acousto-optic deflector, an electro-optic element and a polygonal mirror, there is appropriate adjustment to the first and second optical paths.

INDUSTRIAL APPLICABILITY

The principle of the aforementioned embodiments is very appropriately applicable to techniques for observing objects. Particularly, confocal microscopes manufactured on the basis of the principle of the aforementioned embodiments are appropriately applicable for medical cell diagnosis and observation of biological samples.

The invention claimed is:

1. A confocal microscope comprising:
   a light generator including a light source portion, an object lens, and a collimator lens, and configured to simultaneously generate reflection light, which is reflected from a sample, and transmission light, which passes through the sample;
   a scanner including a first reflective portion and a first driver, and configured to optically scan the sample and define a direction of a first optical path, along which the reflection light propagates;
   an adjuster including a second reflective portion and a second driver, and configured to angularly adjust a direction of a second optical path, along which the transmission light propagates;
   a first signal generator including a first optical condenser, a first transmissive member, and a first detector, and configured to generate a first signal based on the reflection light;
   a second signal generator including a second optical condenser, a second transmissive member, and a second detector, and configured to generate a second signal based on the transmission light;
   an image generator including a signal processing processor, and configured to generate and output for display a synthetic image, wherein the synthetic image is a composite of a reflection image represented by the reflection light and a transmission image represented by the transmission light that are synthesized in response to the first and second signals; and a control circuit configured to control a driving operation of the first driver of the scanner and a driving operation of the second driver of the adjuster.

2. A confocal microscope comprising:

a light generator configured to simultaneously generate reflection light, which is reflected from a sample, and transmission light, which passes through the sample;

a scanner configured to optically scan the sample and define a direction of a first optical path, along which the reflection light propagates;

an adjuster configured to angularly adjust a direction of a second optical path, along which the transmission light propagates;

a first signal generator configured to generate a first signal based on the reflection light;

a second signal generator configured to generate a second signal based on the transmission light;

an image generator including a signal processing processor, and configured to generate and output for display a synthetic image, wherein the synthetic image is a composite of a reflection image represented by the reflection light and a transmission image represented by the transmission light that are synthesized in response to the first and second signals; and a control circuit configured to control the scanner and the adjuster, wherein the light generator includes a light source portion, which emits emission light, an object lens, which condenses the emission light toward the sample to form a sample focal point, and a collimator lens, wherein the first signal generator includes a first optical condenser, which condenses the reflection light to form a first focal point, a first transmissive member, which has a first transmissive area around the first focal point to allow passage of the reflection light and a first blocking area around the first transmissive area to block the reflection light, and a first detector, which detects intensity of the reflection light passing through the first transmissive area to generate the first signal, wherein the second signal generator includes a second optical condenser, which condenses the transmission light to form a second focal point, a second transmissive member, which has a second transmissive area to allow passage of the transmission light and a second blocking area around the second transmissive area to block the transmission light, and a second detector, which detects intensity of the transmission light passing through the second transmissive area to generate the second signal, wherein the scanner includes a first reflective portion, which reflects the emission light and the reflection light on the first optical path, and a first driver, which drives the first reflective portion to displace the sample focal point in a main scanning direction and a sub-scanning direction which are defined on the sample, wherein the adjuster includes a second reflective portion, which reflects the transmission light on the second optical path, and a second driver, which drives the second reflective portion, and wherein the control circuit controls a driving operation of the first driver and a driving operation of the second driver to keep the second focal point in the second transmissive area while the sample focal point is displaced on the sample.

3. The confocal microscope according to claim 2, wherein the collimator lens is situated on the second optical path, wherein the object lens generates first collimated light from the reflection light which is emitted from the sample focal point, wherein the collimator lens generates second collimated light from the transmission light which is emitted from the sample focal point, wherein the first collimated light reaches the first signal generator from the object lens through the scanner, and wherein the second collimated light reaches the second signal generator from the collimator lens through the adjuster.

4. The confocal microscope according to claim 3, wherein the control circuit makes the driving operation of the second driver collaborated with the driving operation of the first driver.

5. The confocal microscope according to claim 4, wherein the first reflective portion includes a first reflector, which displaces the sample focal point in the main scanning direction, and a second reflector, which displaces the sample focal point in the sub-scanning direction, wherein the first driver includes a first driving device, which drives the first reflector, and a second driving device, which drives the second reflector, wherein the second reflective portion includes a third reflector, which operates in synchronization with the first reflector, and a fourth reflector, which operates in synchronization with the second reflector, and wherein the second driver includes a third driving device, which is controlled in association with the driving operation of the first driving device by the control circuit, and a fourth driving device, which is controlled in association with the driving operation of the second driving device by the control circuit.

6. The confocal microscope according to claim 5, wherein the control circuit controls the third driving device to make displacement in the main scanning direction of the sample focal point less influential to a position of the second focal point, and wherein the control circuit controls the fourth driving device to make displacement in the sub-scanning direction of the sample focal point less influential to a position of the second focal point.

7. The confocal microscope according to claim 3, further comprising:

a stage on which the sample is placed;

a displacement mechanism configured to displace the stage along an optical axis defined between the object lens and the collimator lens;

a first correction portion configured to correct spherical aberration of the emission light between the scanner and the object lens; and a second correction portion configured to correct spherical aberration of the second collimated light, wherein the control circuit controls the first and second correction portions in response to a position of the stage on the optical axis defined between the object lens and the collimator lens, and adjusts the spherical aberration of the emission light and the spherical aberration of the second collimated light.

8. The confocal microscope according to claim 3, further comprising:

a first correction portion configured to correct spherical aberration of the emission light between the scanner and the object lens;

a second correction portion configured to correct spherical aberration of the second collimated light;
a first aberration detector which detects spherical aberration of the first collimated light to generate a first aberration signal representing the spherical aberration of the first collimated light; and
a second aberration detector which detects spherical aberration of the second collimated light to generate a second aberration signal representing the spherical aberration of the second collimated light,
wherein the control circuit controls the first and second correction portions in response to the first and second aberration signals, and adjusts the spherical aberration of the emission light and the spherical aberration of the second collimated light.

9. The confocal microscope according to claim 7,
wherein each of the first and second correction portions is a liquid crystal device including a liquid crystal element or a lens device having a plurality of lenses including a movable lens.

10. The confocal microscope according to claim 2,
wherein the control circuit includes an inclination detector, which detects an inclination of an optical path of the emission light passing through the scanner and outputs a detection signal representing the inclination of the optical path of the emission light, and a synchronization control circuit, which performs synchronous control between the scanner and the adjuster in response to the detection signal.

11. The confocal microscope according to claim 2,
wherein the control circuit includes an inclination detector, which detects an inclination of an optical path of the transmission light and outputs a detection signal representing the inclination of the optical path of the transmission light, and a synchronization control circuit, which performs synchronous control between the scanner and the adjuster in response to the detection signal.

12. The confocal microscope according to claim 7, further comprising:
a third correction portion configured to correct coma aberration of the emission light between the scanner and the object lens; and
a fourth correction portion configured to correct coma aberration of the second collimated light,
wherein the control circuit includes an inclination detector, which detects an inclination of an optical path of the emission light passing through the scanner and outputs a detection signal representing the inclination of the optical path of the emission light, and controls the third and second correction portions in response to the detection signal.

13. The confocal microscope according to claim 2,
wherein the light source portion includes a first laser source, which emits a first laser beam as the emission light, and a second laser source, which emits a second laser beam as the emission light different in wavelength from the first laser beam.

14. A confocal microscope comprising:
a light generator including a light source portion, an object lens, and a collimator lens, and configured to simultaneously generate reflection light, which is reflected from a sample, and transmission light, which passes through the sample;
a scanner including a first reflective portion and a first driver, and configured to optically scan the sample and define a direction of a first optical path, along which the reflection light propagates;
an adjuster including a second reflective portion and a second driver, and configured to angularly adjust a direction of a second optical path, along which the transmission light propagates;
a first signal generator including a first optical condenser, a first transmissive member, and a first detector, and configured to generate a first signal based on the reflection light;
a second signal generator including a second optical condenser, a second transmissive member, and a second detector, and configured to generate a second signal based on the transmission light;
an image generator including a signal processing processor, and configured to generate and output for display a synthetic image, wherein the synthetic image is a composite of a reflection image represented by the reflection light and a transmission image represented by the transmission light that are synthesized in response to the first and second signals; and
a control circuit configured to control a driving operation of the first driver of the scanner and a driving operation of the second driver of the adjuster,
wherein the image generator includes a brightness adjuster which performs a brightness adjustment process to decrease a difference in brightness level between the reflection image and the transmission image.

15. The confocal microscope according to claim 14,
wherein the brightness adjuster includes an amplifier which amplifies the first signal to generate an amplified signal, and
wherein the image generator includes a synthesizer which generates the synthetic image from the amplified signal and the second signal.

16. The confocal microscope according to claim 14,
wherein the brightness adjuster includes an attenuator which attenuates the second signal to generate an attenuated signal, and
wherein the image generator includes a synthesizer configured to generate the synthetic image from the attenuated signal and the first signal.

17. The confocal microscope according to claim 14,
wherein the brightness adjuster includes an amplifier, which amplifies the first signal to generate an amplified signal, and an attenuator, which attenuates the second signal to generate an attenuated signal, and
wherein the image generator includes a synthesizer configured to generate the synthetic image from the amplified signal and the attenuated signal.

18. The confocal microscope according to claim 14,
wherein the brightness adjuster amplifies the first signal at an amplification rate from 10 times to 100 times.

19. A confocal microscope comprising:
a light generator including a light source portion, an object lens, and a collimator lens, and configured to simultaneously generate reflection light, which is reflected from a sample, and transmission light, which passes through the sample;
a scanner including a first reflective portion and a first driver, and configured to optically scan the sample and define a direction of a first optical path, along which the reflection light propagates;

an adjuster including a second reflective portion and a second driver, and configured to angularly adjust a direction of a second optical path, along which the transmission light propagates;
a first signal generator including a first optical condenser, a first transmissive member, and a first detector, and configured to generate a first signal based on the reflection light;
a second signal generator including a second optical condenser, a second transmissive member, and a second detector, and configured to generate a second signal based on the transmission light;
an image generator including a signal processing processor, and configured to generate and output for display a synthetic image, wherein the synthetic image is a composite of a reflection image represented by the reflection light and a transmission image represented by the transmission light that are synthesized in response to the first and second signals; and
a control circuit configured to control a driving operation of the first driver of the scanner and a driving operation of the second driver of the adjuster,
wherein each of the scanner and the adjuster includes at least one selected from a group consisting of a galvanomirror, an acousto-optic deflector, an electro-optic element and a polygonal mirror.

* * * * *